United States Patent [19]
Patterson

[11] 3,710,511
[45] Jan. 16, 1973

[54] PROCEDURES FOR USE OF GENIC MALE STERILITY IN PRODUCTION OF COMMERCIAL HYBRID MAIZE

[75] Inventor: Earl Byron Patterson, Urbana, Ill.

[73] Assignee: University of Illinois Foundation, Urbana, Ill.

[22] Filed: April 21, 1971

[21] Appl. No.: 135,873

[52] U.S. Cl. .................................. 47/58, 47/DIG. 1
[51] Int. Cl. ............................................. A01g 1/00
[58] Field of Search ........................... 47/58, DIG. 1

[56] References Cited

UNITED STATES PATENTS

| | | | |
|---|---|---|---|
| 2,753,663 | 7/1956 | Jones | 47/58 |
| 2,948,987 | 8/1960 | Powers et al. | 47/58 |
| 3,570,181 | 3/1971 | Davis | 47/58 |
| 3,621,612 | 11/1971 | Porter | 47/58 |

*Primary Examiner*—Robert E. Bagwill
*Attorney*—Merriam, Marshall, Shapiro & Klose

[57] ABSTRACT

Procedures for use of genic male sterility in the production of commercial hybrid maize, including producing and maintaining seed stocks substantially of a homozygous male sterile genotype and stocks substantially of a heterozygous, male sterile allele and male fertile allele, genotype, which include a differentially transmitted variation of chromosomal constitution.

21 Claims, 45 Drawing Figures

PATENTED JAN 16 1973

INVENTOR
EARL B. PATTERSON
BY
ATTORNEYS

INVENTOR
*EARL B. PATTERSON*
BY
ATTORNEYS

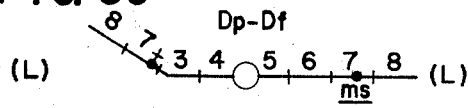
FIG. 39
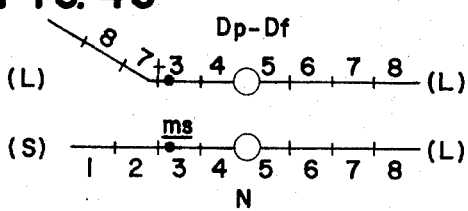
FIG. 40
FIG. 44
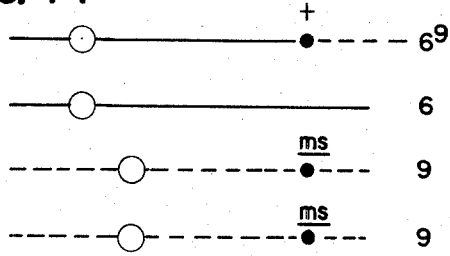
FIG. 41
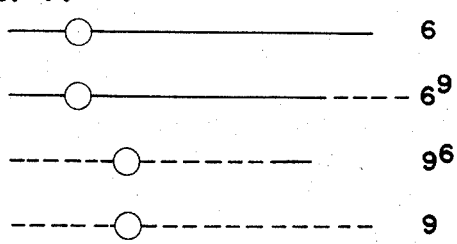
FIG. 45
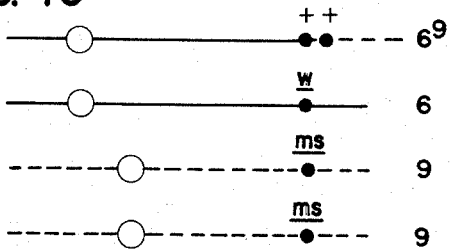
FIG. 42
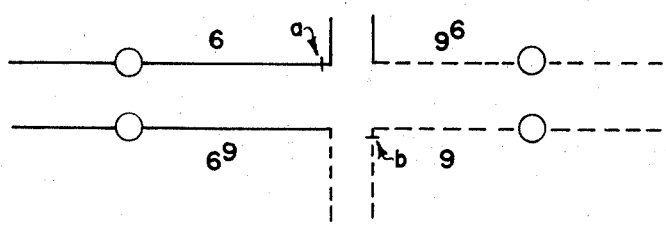
FIG. 43
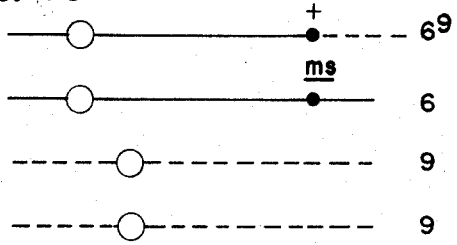

PROCEDURES FOR USE OF GENIC MALE STERILITY IN PRODUCTION OF COMMERCIAL HYBRID MAIZE

BACKGROUND OF THE INVENTION

1. Field of the Invention

The present invention relates generally to genetic procedures involving maize plants and more particularly to procedures for deriving maize seed of particular genetic compositions. An understanding of the procedures of the invention may be derived through consideration of certain illustrative aspects of the genetics of maize together with definitions of certain terms employed in the art.

2. Brief Description of The Drawing of The Prior Art

FIGS. 1 through 23 and 25 through 27 graphically illustrate maize plant chromosomes. FIG. 24 graphically illustrates representative gross maize pollen phenotypes.

3. Description of The Prior Art a. General Background

Broadly stated, genetics is the study of heredity and encompasses among its many aspects the study of mechanisms of transmission of hereditary factors as well as research into the underlying causes of variation in characteristics among organisms.

A basic structural unit of all higher organisms is the cell. Within cells is a chemically and structurally complex material called protoplasm which comprises the living material of the cell. In nearly all cells, part of the protoplasm comprises a structure termed the cell nucleus which exercises a primary role in directing the metabolism of the cell and which contains substantially all of the known genetically significant materials of the cell. The balance of the protoplasm of cells, that is, the protoplasm which is not part of the nucleus, is termed the cell cytoplasm.

Within the cell nucleus are materials which constitute genetically significant structures called chromosomes. At times in the life cycle of cells, chromosomes in the cell nucleus may be visible with the aid of a microscope and appear as linear bodies or strands. Thus viewed, chromosomes most often appear to consist of a short "arm" segment joined at a differentiated region termed the centromere to another longer "arm" segment. Maize plant chromosomes are thus often graphically represented as two lines of unequal length joined at a circle, as shown in FIG. 1.

The basic functional hereditary units of chromosomes are termed genes. Genes occupy relatively fixed positions or loci in chromosomes and each has a specific influence upon the expression of a particular characteristic or characteristics of the organism. Genes are often graphically represented by dots on lines which represent chromosomes, as shown in FIG. 2, even through genes themselves are known to have a linear structure.

Alleles are alternative forms of a gene which are frequently distinguishable by their influences on characteristics.

Characteristically, chromosomes are principally composed of protein and complex chemical molecules of deoxyribonucleic acid (DNA). An understanding of the specific chemical nature and operation of the DNA which comprises the genes of chromosomes is not essential to an understanding of the present invention. It is sufficient to note that the DNA which comprises each gene of a chromosome is capable of directing cell metabolic functions in a particular manner and thus of having a distinctive influence on the expression of a particular characteristic of the organism.

b. Chromosome Number

The total number of chromosomes which may be present in the nucleus of a cell varies from organism to organism. Further, the number of chromosomes found in nuclei of a particular organism ordinarily varies, depending upon the function of the nuclei, i.e., whether the nuclei function in an organism body cell or function in reproduction of the organism.

The body cells of organisms are termed somatic cells and in most organisms such somatic cells typically have a given, specific number of chromosomes in their nuclei. Somatic cell chromosomes are ordinarily present in the cell nucleus as similar, or homologous pairs. Each of the two members of an homologous chromosome pair in a somatic cell nucleus is similar to the other pair member in containing genes relating to the same characteristics, positioned in substantially the same sequences along the chromosome.

Specialized reproductive elements or "gametes" of such organisms have nuclei which ordinarily contain half the total number of chromosomes found in somatic cells and normally none of these chromosomes occur as homologous pairs.

The number of chromosomes in the nuclei of somatic cells of most organisms is said to be a "diploid" number, while the number of chromosomes in the nuclei of gametes of these organisms is said to be a "haploid" number.

Somatic cells of maize plants are normally diploid and their nuclei contain twenty chromosomes in the form of 10 pairs of homologous chromosomes. Gametes (eggs and sperm) of maize are normally haploid and contain 10 non-homologous chromosomes.

A single maize plant is capable of producing both "male" and "female" gametes. The haploid sperm are contained in pollen grains produced in the tassel of the plant. A single haploid egg is located in an embryo sac in each ovary. The ovaries are arranged in rows on structures termed ears.

In the processes of pollination and fertilization, pollen grains fall on thread-like structures called silks which emanate singly from each ovary. Each mature pollen grain contains a tube nucleus and two identical haploid sperm. By a process of enzymatic digestion, a pollen grain "germinates" down a silk, carrying the sperm along to the embryo sac. Both sperm enter the embryo sac, after which time one unites with the egg to form a diploid zygote which develops into the embryo of a kernel; the second sperm unites with two other haploid nuclei present in the embryo sac, the resulting triple-fusion nucleus eventually developing into the endosperm, the starchy portion of a mature maize kernel. When a maize kernel germinates, the plant which develops from the embryo therefore has diploid somatic cells.

c. Gamete Formation

Certain diploid somatic cells in the male inflorescence (tassel) of a maize plant undergo a two-step process termed "meiosis." During meiosis, two consecutive divisions of somatic cell nuclear material give rise to four nuclei, each with a haploid number of chromosomes.

Meiosis in maize is therefore a process during which one diploid nucleus containing 20 chromosomes gives rise to four haploid nuclei, each containing 10 chromosomes. This reduction of chromosome number from diploid level to haploid level is a consequence of the fact that the meiotic process includes a single effective doubling of chromosomes during the course of two divisions.

In the first division process of meiosis there is no doubling in effective chromosome number. Rather, members of homologous chromosome pairs are disjoined and assorted to different nuclei. As a consequence, each "daughter" nucleus receives only one representative of each homologous chromosome pair, and thus includes a total of 10 chromosomes. Each such chromosome, however, though it behaves as a single unit, actually consists of two strands, or chromatids.

At the second division process of meiosis, the two chromatids of each chromosome separate and are assorted, each to one of the daughter nuclei.

By way of illustration, if each chromosome were assumed to proceed through meiosis as a single, indivisible unit, each pair of chromosomes present in a somatic cell might be numbered from 1 through 10 and each member of a particular homologous pair designated as either "A" or "B." A maize plant somatic cell nucleus could thus be designated as containing the following chromosomes: 1A; 1B; 2A; 2B; 3A; 3B; 4A; 4B; 5A; 5B; 6A; 6B; 7A; 7B; 8A; 8B; 9A; 9B; 10A; and, 10B. The two chromosomal arrays formed during meiosis would each contain 10 non-homologous chromosomes. Each one of the 10 would be substantially identical to either an "A" or "B" member of one of the 10 pairs.

Thus, one array might contain chromosomes similar to the following: 1A; 2B; 3A; 4A; 5B; 6A; 7A; 8B; 9B; and, 10A. If this were the case, the other chromosomal array would contain ten chromosomes similar to the following: 1B; 2A; 3B; 4B; 5A; 6B; 7B; 8A; 9A; and 10B. The combinations of A and B pair members would ordinarily be random. In actual fact, the foregoing description of assortment of members of homologous pairs applies strictly only to the centromeres. Homologous chromosomes do not behave a single, indivisible units during meiosis but rather exchange segments as a result of a phenomenon termed "crossing over" which is discussed in detail later. As will be seen, crossing over may result in the incorporation of new combinations of specific segments into one chromosome that were previously carried separately in the parental homologous chromosomes.

In the tassel, each of the four haploid nuclei deriving from a single diploid somatic cell that undergoes meiosis becomes enclosed by a cell wall and develops into a haploid "microspore."

Microspores later develop into mature pollen grains by a process which includes duplication and division of haploid nuclear material to form two microspore daughter nuclei, one of which undergoes a subsequent duplication and division. Each mature pollen grain contains three haploid nuclei. One of these nuclei, termed the tube nucleus, is important in the metabolic activities of the pollen grain while the remaining two haploid nuclei assume a specialized function as sperm.

In sum, meiosis and male gamete formation in maize gives rise to eight haploid sperm from each diploid somatic cell undergoing meiosis.

Meiosis in maize egg-propagating somatic cells proceeds substantially as previously described with reference to sperm-propagating cells except that there is a single surviving haploid meiotic product termed the megaspore. Each megaspore undergoes successive divisions to form eight identical haploid nuclei enclosed in an embryo sac. One of these nuclei becomes included in a mature haploid egg cell which forms a diploid zygote upon fusion with a haploid sperm. Two other nuclei in the embryo sac, the polar fusion nuclei, combine with the second sperm from a pollen grain to form a triple fusion nucleus from which the endosperm of a kernel develops.

d. Linkage and Cross-over

At this point, the phenomenon of linkage bears consideration. As mentioned earlier, genes occupy relatively fixed loci on chromosomes and have specific effects upon the expression of particular characteristics of an organism.

While individual genes are not presently susceptible to visual identification, their positions on chromosomes may be "mapped" inferentially through detailed observation of the inheritance of characteristics influenced by genes.

Upon finding that certain distinct physical characteristics are inherited together by offspring in a frequency greater than would be predicted on the basis of random assortment of chromosomes in meiosis, it may be inferred that the genes responsible for such characteristics are present on the same chromosome. Extensive observations on the associations of many different characteristics in inheritance have led to the assignment of loci of particular genes on particular chromosomes.

Hypothetically, for example, it might have been determined that a gene responsible for expression of maize plant height is present on members of an homologous chromosome pair designated as chromosome 1 in maize. Through a series of inheritance studies it might further have been determined that the locus of this gene is on the long arm of the chromosome at a physical position about two-thirds of the distance from the centromere to the tip of the arm. Still further, it might be known that two allelic (alternative) forms of this gene exist: (1) an allele found in true breeding maize strains of normal height and designated as a "D" allele; and, (2) an allele found in a true breeding dwarf maize strain and designated *d*.

A chromosome 1 of the true breeding strain of normal height could be graphically represented as in FIG. 3. Similarly, a chromosome 1 of the true breeding dwarf strain could be represented as in FIG. 4.

As a further example, a gene responsible for expression of plant coloration might be located on chromosome 1 at a physical position one-half the distance from the centromere to the long arm tip. It might also be determined that two allelic forms of this gene exist: (1) an allele found in true breeding maize strains of a normal green appearance and designated "G"; and, (2) an allele found in true breeding strains of a golden appearance and designated *g*.

A chromosome 1 of the true breeding strain of normal green appearance could be represented as in FIG.

5. Similarly, a chromosome 1 of the true breeding strain of golden appearance could be represented as in FIG. 6.

Since the above-mentioned genes for plant height and plant coloration are present on the same chromosome and will thus usually be transmitted together on that chromosome, the genes will be said to be "linked" in inheritance.

The closely related phenomenon of crossing-over now bears consideration. During meiosis it sometimes occurs that a portion of one chromosome pair member will, in effect, exchange its position with a corresponding portion of the other homologous member of the pair. At this stage in meiosis, each of the paired homologous chromosomes consists of two strands (sister chromatids). By way of example, if one member of a homologous chromosome pair were represented with a solid line and the other with a dotted line, the pair could be represented as in FIG. 7. Crossing over occurs between non-sister chromatids in such a "tetrad" (grouping of four) of chromatids. If the crossing-over phenomenon were to take place during meiosis, pair members which had undergone mutual exchange of homologous portions could be represented as in FIG. 8.

The crossing-over phenomenon is quite significant when considered in view of the linkage of genes directing the expression of particular traits.

If, for example, a particular plant received from its normal height male parent a chromosome 1 having a D gene allele and a G gene allele, and further received from its dwarf female parent a chromosome 1 carrying a $d$ gene allele and a $g$ gene allele, the somatic cell constitution with regard to this chromosome pair could be represented as in FIG. 9, wherein a solid line represents the chromosome derived from the male parent and a dotted line represents the chromosome derived from the female parent.

If cross-over occured in this homologous pair during meiosis, the following results might be obtained:

1. Crossing-over might occur distal to the D gene locus, with the resulting cross-over strands represented as in FIG. 10; or,
2. Crossing-over might occur between the D gene locus and G gene locus yielding cross-over strands as represented in FIG. 11; or,
3. Crossing-over might occur at a position proximal to the G gene locus, yielding cross-over strands as represented in FIG. 12.

Genetic maps of chromosomes are constructed that provide a graphic representation of the relative positions and sequence of gene loci. The distance shown between adjacent genes on such maps is based on the amount of crossing-over between gene loci as measured in actual linkage experiments. The sequence of genes on the linkage map of a particular chromosome is found to agree with the sequence of genes on the physical chromosome. However, genetic maps do not provide an accurate representation of the relative physical distances between gene loci on chromosomes, since crossing-over may vary among different chromosome segments of similar physical length.

If two gene loci are closely linked genetically, it is likely that the specific combinations of alleles at these loci which are present on members of an homologous pair of chromosomes will be transmitted in these same parental combinations to gametes. In the extreme case of complete linkage, a chromosome transmitted to a gamete would always carry one or the other of the two combinations carried by the parental homologues.

e. Dominance and Recessiveness

In considering the characteristics of an organism within a genetic framework, attention is given to the "genotype" and "phenotype" of the organism. The genotype is the genetic constitution of an individual. The phenotype of an individual is comprised of its manifested characteristics. The genotype sets certain limits upon the potentialities for development. The total environmental circumstances, both internal and external, determine the degree to which these potentials are realized in the phenotype that is ultimately expressed.

Certain important aspects of the influence of genotype on the expression of phenotype may be understood through consideration of the phenomenon of gene dominance and recessiveness.

It is well known that certain gene alleles which are associated with a given mode of expression of a particular trait will dominate other gene alleles associated with other modes of expression of the same trait. Generally speaking, this is to say that if such a dominating gene allele is present on one member of a chromosome pair, the mode of expression of the trait associated with that allele will be exhibited by the organism irrespective of the fact that a gene allele associated with another mode of expression of the trait may be present on the homologous member of a chromosome pair. With varying dosages of differing alleles, intermediate phenotypes may sometimes be expressed. The particular allele which dominates is termed the dominant allele, while the allele which is dominated is termed the recessive allele.

The previously noted alleles associated with plant height in maize may be considered as illustrative of gene dominance and recessiveness. The allele associated with normal plant height, i.e., the D allele, is dominant over the $d$ allele present in dwarf plants.

If, for example, a particular plant developed from a zygote which received a chromosome pair member carrying the D allele from one parent and the other pair member carrying the $d$ allele from the other parent, the plant would be designated as being of a heterozygous genotype for height. The chromosome pair under consideration could be graphically represented as in FIG. 13. A more convenient graphic representation of this genotype would be D/$d$. Since in this case the D allele dominates the recessive, $d$ allele, the phenotype expressed would be that associated with the D allele, a normal plant height.

If, alternatively, the zygote had received chromosome pair members from its parents, each of which bore the D allele, the genotype would be designated as homozygous and represented as D/D. the phenotype expressed would likewise be normal plant height.

Lastly, if the zygote had received parental chromosome pair members, each of which bore the $d$ allele, the genotype would be designated as homozygous and represented as $d$/$d$. The phenotype expressed would be dwarfism.

It may thus be noted that phenotypic expression of the dwarf trait may only be achieved if a *d* allele is present and there is no D allele present on an homologous chromosome.

f. Variations of Chromosomal Constitution

Another genetic phenomenon of importance in the present invention is the existence of chromosomal aberration in the form of variations in chromosomal constitution. Chromosomal variations may occur naturally or may result from deliberate exposure of cells to mutagenic agents. For the purposes of the present invention, consideration is given to three significant categories of chromosomal variation: (1) simple deficiencies; (2) duplication-deficiencies present in chromosomes derived from pericentric inversions; and, (3) duplication-deficiencies present in chromosome complements derived from reciprocal translocation stocks.

Simple deficiencies consist of internal or terminal deletions of chromosomal segments. By way of graphic example, if a particular chromosome were arbitrarily divided into 10 numbered segments it would be represented as in FIG. 14. An internal chromosomal deficiency could be represented as in FIG. 15. A terminal chromosomal deficiency could be represented as in FIG. 16.

Duplicate deficient chromosome strands (chromatids) arise from heterozygous pericentric inversions following recombination between the interchange points as a result of crossing-over within the inverted segment during meiosis. According to the graphic scheme used above in representing simple deficiencies, an example of the mutually complementary constitutions of duplicate-deficient chromatids which arise as reciprocal products of a single recombinational event may be represented as in FIG. 17.

Duplicate-deficient chromosomes of the constitution shown in FIG. 17, when combined in zygotes with normally arranged chromosomes yield constitutions as shown in FIGS. 18 and 19. Note that in each case one segment normally present is deleted and one segment appears three times in the chromosome pair. The segment appearing three times is called the triplicated segment.

Duplicate-deficient chromosome complements arise as a segregational event in plants heterozygous for a reciprocal translocation. Gametes carrying such a duplicate-deficient complement are deficient for the segment distal to one interchange point and are duplicated for the chromosome segment distal to the other interchange point. By way of graphic representation, if chromosome 6 pair members were designated with continuous lines and chromosome 9 pair members were designated with dashed lines, the two pairs could be represented as in FIG. 20 before reciprocal translation. Arrows indicate points at which a reciprocal translocation might occur. Following reciprocal translocation at the points indicated in FIG. 20, the pairs could be represented as in FIG. 21.

The member of the chromosome 6 pair bearing a segment of chromosome 9 material would be designated "$6^9$," while the normal member would be referred to as "6." The chromosome 9 pair members would similarly be designated as "$9^6$" and "9."

FIG. 21 indicates the chromosomal constitution of a plant heterozygous for a reciprocal translocation. If in a plant having the constitution shown in FIG. 21 a duplicate-deficient egg carrying chromosomes $6^9$ 9 was fertilized by a normal sperm carrying chromosomes 6 9, the resultant zygote would be of the duplicate-deficient constitution shown in FIG. 22. If alternatively, a duplicate-deficient egg carrying chromosomes 6 $9^6$ were fertilized by a normal sperm carrying chromosomes 6 9, the resultant zygote would be of the duplicate-deficient constitution shown in FIG. 23.

A significant characteristic of chromosomal variations of the types above-described is that some of them exhibit "differential transmission," i.e., some such variations are egg-viable with substantial frequency, but not pollen transmitted either because of pollen abortion or inability to compete with normal pollen in effecting fertilization. This is to say that in some cases the presence of such chromosomal variations in eggs will not substantially interfere with their ability to participate in the formation of a zygote, while substantially no pollen grains containing such variations will be able to function, or compete, in effecting fertilization.

Two aspects of differential transmission are important in the procedures of the present invention. The first of these relates to differential egg- and pollen-transmissibility of unbalanced chromosome complements. For use with procedures described herein, unbalanced chromosome complements would be selected that are egg-viable with substantial frequency but which are not pollen transmitted with appreciable frequency, either because pollen grains carrying such unbalanced complements would abort or because such pollen grains would be unable to complete with pollen grains carrying normal, or balanced, chromosome complements in effecting fertilization. The first of these aspects, then, is the differential female-versus male-transmissibility of unbalanced chromosome complements. The second aspect is the differential pollen-trans-missibility of balanced versus unbalanced chromosome complements.

The effects of chromosome imbalance are frequently expressed in pollen phenotypes. Presumably, such pollen phenotypes reflect specific effects of the genic content of pollen nuclei. In general, pollen grains that carry an extra chromosome segment in addition to the normal genome are not visibly different in gross phenotype from normal pollen grains that carry a balanced genome. On the other hand, the phenotypic effects of chromosome deficiency upon gross pollen morphology is frequently clearly apparent. In general, the effects of long deficiencies are more extreme than are the effects of short deficiencies, but the correlation is probably simply a consequence of the fact that long deficiencies are more likely to include gene loci affecting normal pollen development. Observations of pollen phenotypes associated with a wide array of deficient segments indicate that genes influencing normal pollen development are numerous and are distributed throughout the maize genome. Careful observations of pollen phenotypes reveal that typically, within a rather narrow range of variation, a characteristic pollen phenotype is associated with deficiency for a specific segment.

Representative gross maize pollen phenotypes illustrating characteristics allowing visual distinction between normal pollen grains and those bearing chromosomal variations of the types above-described are shown in FIG. 24.

A normal pollen grain 1 viewed under a light microscope at low magnification is typically spherical in shape and has an opaque appearance since it is densely packed with starch. Pollen grains bearing such chromosomal variations may be variously visually distinct from a normal pollen grain 1. Grains 2, 3 and 4, for example, are of similar or smaller size and are virtually devoid of starch. Grains 5, 6 and 7 contain only small amounts of starch. Grains 8, 9 and 10, while they appear to be uniformly filled with starch do not appear to be as densely packed; such grains under transmitted light have a hazy, transluscent appearance. Grains 11, 12 and 13 display a clear-sectored appearance.

Pollen grains deficient for short chromosome segments often are not distinguishable from normal pollen by gross phenotype. Of some 50 instances of duplicate-deficient chromosome complements in maize that are known, or predicted, to be egg-transmissible, the corresponding pollen phenotypes in most instances are no more extreme than those depicted in grains 8 through 13 in FIG. 24. On the basis of present evidence, it appears unlikely, in general, that deficient chromosome complements which give distinctly visible sub-normal pollen phenotypes will be pollen transmitted in appreciable frequencies under conditions of competition with normal pollen.

Source stocks of male sterile genes and of chromosomal aberrations of the types described earlier are currently maintained and are available to research workers upon request from the Maize Cooperation Genetic Stock Center at the University of Illinois, Urbana, Illinois. Relatively few of the many chromosome deficiencies which have been induced in past years were identified and saved. There are also a limited number of identified pericentric inversions.

The Maize Corporation collection includes stocks of approximately 865 reciprocal translocations whose cytological interchange points have been determined (Longley, A.E., Crops Research Bulletin, ARS 34–16 (1961)). A considerable number of these rearrangements are known to exhibit egg-transmission of duplicate-deficient chromosome complements, and others are expected to do so from evidence based on pollen phenotypes and off-ratios of genetic markers. The inheritance and segregational behavior of a number of reciprocal translocations in chromosome 6 that transmit duplicate-deficient chromosome complements have been described (Burnham, C.R., P.N.A.S. 18:434–440 (1932) and Genetics 35:446–481 (1950).) A preliminary report (Patterson, E. B., Genetics 37:612–613 (1952)) noted several additional instances and pointed out some of the uses of duplicate-deficient stocks in genetic studies. Subsequent reports (Patterson, E. B., Maize Genetics Cooperation Newsletter, 32:54–66 (1958) and 33:131 (1959)) presented data showing further cases of proven or probable transmission. On the basis of a number of types of evidence, it appears likely as a conservative estimate that at least fifty reciprocal translocations yield transmissible duplicate-deficient chromosome complements.

g. Hybrid Production

The procedures of the present invention are useful in the production of hybrid maize seed stocks for planting in farm fields. Hybrid maize seed is derived by maize breeders through cross-pollination of maize plants of one genetic composition with maize plants of a differing genetic composition.

The term, "genetic composition" as used herein to describe plants participating in hybridization shall be taken to include plants of inbred lines, single-cross hybrids, or plants otherwise of hybrid constitution. Thus, to derive seed of an "XY" hybrid which expresses desirable traits of both an "X" genetic composition and a "Y" genetic composition the breeder could grow rows of the "X" plants and attempt to insure that only pollen from "Y" plants would pollinate the "X" plants. If this result were achieved, all seed produced on the "X" plants would be of the desired "XY" hybrid type. The hybrid could also be produced, of course, through insuring pollination of rows of "Y" plants with only pollen from "X" plants.

The most economical method of producing such hybrid seed in the large quantities needed for sale to corn farmers would be to plants rows of "X" plants close enough to rows of "Y" plants so that the desired cross-pollination will be accomplished by the wind. (The plants of one genetic composition would be said to be in "pollinating proximity" to those of the other genetic composition.)

Such a scheme of hybrid production is complicated by the bisexual nature of maize plants. Unless some genetic or manual manipulation is performed, each plant of one variety (e.g. the "X" variety) is likely either to self-pollinate (selfing) or to pollinate other plants of the same variety in the same row (sibbing). This would result in the production of other than the desired "XY" hybrid seed (e.g. pure "X" variety might be produced on "X" plants).

The breeder could insure against self or sib-pollination by going through all the "X" rows and manually removing the tassels on those plants as they are produced. If this were done, the only pollen source of pollinating the "X" plants would be that pollen formed on the "Y" plants, and formation of the desired XY hybrid seed on the "X" plants would be virtually guaranteed.

Such a manual detasseling procedure requires a large temporary labor force at the time tassels appear on plants. Reliable estimates indicate that nearly 100,000 temporary laborers would need to be employed by maize breeders throughout the United States if all hybrid seed production were to involve this procedure.

It should be noted that no machine yet devised has been sufficiently efficient to perform the detasseling procedure automatically in a wholly satisfactory manner, since cutting at a uniform level above the ground will insufficiently detassel some plants while cutting too far down the stalks of other plants.

h. Male Sterility

One of the known genetically influenced characteristics of maize plants is "male sterility." This term is used to describe a plant phenotype wherein tassels are formed on maize plants but no viable pollen is shed. Since these plants do not produce pollen grains normally functional in fertilization, they are said to be male sterile.

The characteristic of male sterility in maize plants commonly does not preclude the production of viable eggs in these plants. This is to say that a male sterile plant may still produce eggs which are capable of being fertilized and forming zygotes (i.e., viable eggs), but such plants do not produce pollen grain normally functional in fertilization. Thus, to produce ears of maize on a plant which is male sterile, pollen must be provided by some neighboring plant which is not male sterile (known as a normal or "male fertile" plant). Male sterile maize plants obviously can neither self-pollinate nor sib pollinate neighboring plants and are therefore quite useful in production of hybrid maize.

Male sterility in maize plants is classified, according to etiology, as being of two types, i.e., cytoplasmic male sterility and genic male sterility.

Cytoplasmic male sterility is that type which results from genetic material present in the cytoplasm of cells. Since transmission of cytoplasmic material from pollen to zygote in the process of fertilization is thought to be very rare, the cytoplasm of the zygote ordinarily derives exclusively from cytoplasm present in egg cells of the female parent. Thus, seed produced on a cytoplasmically male sterile plant carries sterile cytoplasm because the seed derives from egg cells having sterile cytoplasm.

Procedures for use of cytoplasmic male sterility in the production of commercial hybrid maize are set forth in U. S. Pat. No. 2,753,663. Briefly stated, the procedures of that patent include the pollination of cytoplasmically male sterile inbred lines of egg parents by inbred lines of pollen parents possessing nuclear "pollen restorer" genes to effect production of hybrid seed stocks which will yield male-fertile plants in farmers' fields.

The effect of such nuclear restorer genes is to prevent the expression of the male sterility characteristic by the genetic materials present in the sterile cytoplasm.

Nearly all of the hybrid maize seed stocks used in the U. S. in recent years have been produced by the methods of that patent and have carried a specific sterile cytoplasm, the so-called Texas-sterile or "T-sterile" cytoplasm.

It has been confirmed recently that plants carrying T-sterile cytoplasm, whether or not nuclear pollen restorer genes ($Rf_1$, $Rf_2$) are present, are significantly more susceptible to damage by two leaf diseases, yellow leaf blight (caused by a species of Phyllosticta) and a form of southern leaf blight caused by the T-strain of *Helminthosporium maydis* (Hooker, A.L., et. al., Plant Disease Reporter 54:708–712 (1970); Smith, D.R., et. al., Plant Disease Reporter 54:819–822 (1970). This finding clearly indicates that T-sterile cytoplasm differs from normal cytoplasm in heritable components affecting not only pollen fertility but disease susceptibility as well. The heavy damage from these diseases in farmers' fields during the past seasons has been directly related to the widespread use of T-sterile cytoplasm in commercial hybrid maize.

A number of other sterile cytoplasms have been recognized in maize, and plants carrying certain of them appear to be no more susceptible to the above two diseases than are their normal cytoplasm counterparts. In general, however, these other cytoplasm types are poorly understood. Methods and stocks may conceivably be developed for using certain of these alternative sterile cytoplasms in commercial procedures similar to those which have been employed with T-sterile cytoplasm. However, there is widespread reluctance among maize breeders to re-establish production based upon the use of sterile cytoplasm, regardless of whether any initial difficulties are encountered. It should be noted in this regard that strains of maize carrying T-sterile cytoplasm appear to be essentially like their normal cytoplasm counterparts in their reaction to the original form (O-strain) of *Helminthosporium maydis*. The preferential susceptibility of maize carrying T-sterile cytoplasm is shown in its reaction to the newly-recognized T-strain of the fungus.

The other type of male sterility, genic male sterility, is occasioned by the presence in maize plant cell nuclei of gene alleles directing toward the expression of this trait in plants carrying non-sterile cytoplasm. To date, some twenty male sterile genes on various maize chromosomes have been discovered having alleles which may give rise to such a male sterile phenotypic expression. This is to say that alleles of any one of some twenty different genes known to exist among the many genes found on maize plant chromosomes may participate in the phenotypic expression of male sterility if the appropriate genotypic constitution is present in the plant cell nuclei.

The use of genic male sterility, then, provides a very valuable alternative method by which breeders may produce hybrid seed stocks. If, for example, genic male sterility were to be bred into maize of the "X" genetic composition designated above, a breeder could plant a row of the "X" plants in pollinating proximity to "Y" genetic composition plants of normal male fertility and be spared the labor of detasseling the "X" plants as tassels appear. Only the tassels of the adjacent normal, male fertile "Y" plants would produce pollen for pollinating "X" and formation of hybrid "XY" seed on "X" plants would be assured.

All known nuclear male sterile gene alleles capable of directing male sterility characteristics have been determined experimentally to be of the recessive type described earlier. This fact further enhances the potential usefulness of genic male sterility to maize breeders. This is because the use of a "Y" pollen parent free of recessive male sterile gene alleles will result in production of "XY" hybrid seed which is heterozygous for alleles at a male sterile gene locus. Since the presence of a dominant, male fertile allele on one member of a chromosome pair will dominate over or mask expression of male sterility by a recessive, male sterile allele on an homologous pair member, the heterozygous hybrid will express phenotypically the normal pollen production required for maximum grain production in farm fields.

This situation may be better understood through a consideration of genotypes of inbred lines which might be involved in hybrid production.

Since a male sterile gene allele, designated "ms," is known to be recessive, expression of the male sterile phenotype by a plant may only be effected if the *ms* gene is present on one member of a particular chromosome pair and no normal, dominant male fertile gene allele, designated "+," is present on the homologous pair member. (Note that the normal allele, +, is an allele of a "male sterile" gene—the locus being named after the trait directed by the recessive allele.)

A graphic representation of this situation would typically be as shown in FIG. 25, wherein recessive male sterile alleles are indicated as present on both members of a chromosome pair arbitrarily designated as the chromosome 1 pair. The genotype of a plant with that combination of alleles may be expressed as $ms/ms$. The nucleus of each egg produced by such a plant will contain a chromosome 1 bearing an $ms$ gene.

If, in producing hybrid seed of the "XY" variety, the genotype of all "X" plants were $ms/ms$ and that of all "Y" plants were $+/+$, (as represented in FIG. 26) all zygotes formed on "X" plants would have a chromosome 1 with a + gene and a chromosome 1 with an $ms$ gene. The genotype would be $+/ms$ as represented in FIG. 27. Such zygotes, heterozygous for the dominant and recessive alleles of the particular male sterile gene, would give rise to plants expressing a normal, male fertile phenotype. Such plants would be of the desired "XY" hybrid type and would shed pollen in farm fields.

Prior to the procedures of the present invention, however, no commercially acceptable method of employing genic male sterility in hybrid maize production was available. This was due to the recessive nature of male sterile gene alleles and the nature of the sterility characteristic itself.

Male sterile plants have the genotype $ms/ms$. In order to produce seed of a given inbred line, e.g., "X" line, having such a genotype, the inbred line must first be "converted" to carry the $ms$ gene. Such conversion may be accomplished by a procedure known as continuous backcrossing. The details of this procedure will be described later. Briefly, the conversion procedure consists of crossing plants of the given inbred line for a number of successive generations with progeny plants in each generation that are confirmed to be of the $ms/+$ genotype by concurrent progeny testing. The final progeny are substantially identical genetically to "normal" plants of the given inbred line except that about half the plants are $ms/+$. Individual plants are then self-pollinated to yield progenies which include $ms/ms$ and $ms/+$ plants. Seed stocks of the converted inbred line may be maintained thereafter by sib pollinations: $ms/ms$ by $ms/+$.

Plants of seed stocks maintained in this way would either be homozygous for the male sterile allele ($ms/ms$) or heterozygous ($+/ms$). The homozygous plants cannot be self-pollinated to produce more seed of the homozygous genotype since they produce no pollen. Since heterozygous plants produce pollen, they may be self-pollinated to produce progeny that would include male sterile plants. The results of such self-pollination are not commercially satisfactory for reasons which follow.

If such heterozygous plants are self-pollinated, the possible genotypes of progeny may be represented on a graphic table known as "Punnett Square." On such a square the types of alleles potentially donated to a zygote by sperm are listed across the top margin and the types potentially donated by eggs are listed down the left margin. The possible combinations of alleles from sperm and eggs are noted within the square as genotypes of zygotes. Table 1 below is a Punnett Square representing the progeny from the self-pollination of a plant heterozygous for the male sterile and male fertile alleles of a particular male sterile gene.

TABLE I

|    | +      | ms     |
|----|--------|--------|
| +  | +/+    | +/ms   |
| ms | ms/+   | ms/ms  |

It should be noted that due to the segregation of homologous chromosome pair members, the heterozygous plant will produce about 50 percent pollen grains carrying sperm with the + gene and 50 percent carrying the $ms$ gene. Likewise, about 50 percent of the eggs will carry the + gene and 50 percent the $ms$ gene.

According to Table I, three possible genotypes may result from selfing such a plant: $+/+$; $+/ms$; and $ms/ms$ ($ms/+$ being equivalent to $+/ms$). Given an expected random fertilization of eggs of both types by sperm of both types, the $+/+$ genotype will be present in 25 percent of seed produced, the $+/ms$ genotype will be present in 50 percent of the seed produced, and the $ms/ms$ genotype will be present in 25 percent of the seed produced. There would be no way, however, to determine what the genotype of a particular seed might be without planting the seed and observing the resulting plant phenotype.

The seed progeny could be planted and only then would those exhibiting the male sterile phenotype be known to have an $ms/ms$ genotype. If such seed were to be used to establish a row of male sterile plants for hybrid production, three-quarters of the plants would have to be detasseled because they would exhibit the normal, male fertile phenotype.

If male sterile plants ($ms/ms$) were pollinated with pollen from heterozygous plants ($+/ms$), the genotypes of resulting progeny may be represented in a Punnett Square as in Table II.

TABLE II

|    | +      | ms     |
|----|--------|--------|
| ms | ms/+   | ms/ms  |

According to Table II, two possible genotypes, $ms/+$ and $ms/ms$ will be present in equal numbers. Statistically, about 50 percent of the seed are homozygous for the male sterile allele and 50 percent heterozygous. Again, there would be no way to determine what the genotype of any seed is before planting and such seed would not be suitable for use in hybrid production.

Use of such "50–50" seed is not commercially suitable since half the resulting plants would require detasseling by the maize breeder in the course of hybrid production.

No procedure heretofore available in the art of maize genetics has been operative in producing seed stocks of a given variety which are predictably constituted of seed of a homozygous male sterile genotype in a proportion greater than about 50 percent.

SUMMARY OF THE INVENTION

The present invention relates to procedures for use of genic male sterility in the production of commercial hybrid maize.

According to the procedures of the invention, inbred lines of maize may be converted to carry male sterile gene alleles and, from such inbred lines, stocks of seed may be obtained which yield male sterile plants in proportions greater than 50%. Such stocks may be employed in the production of hybrid maize.

The procedures of the present invention include the use of variations of chromosomal constitution such as simple chromosome deficiencies, duplication-deficiencies present in chromosomes derived from pericentric inversions, and duplication-deficiencies present in chromosome complements derived from reciprocal translocation stocks. The particular chromosomal aberrations most useful in the practice of the invention are those which are closely linked genetically to male sterile gene loci and which are differentially transmitted.

The procedures of the present invention further relate to the maintenance of stocks of seed of types useful in the above procedures through use of genetic marking procedures.

BRIEF DESCRIPTION OF THE DRAWINGS

FIGS. 28 through 45 illustrate maize plant chromosomes.

DESCRIPTION OF PREFERRED EMBODIMENTS

Figure 1:
Figure 2:
Figure 3:
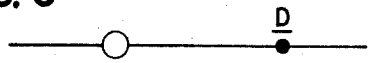
Figure 4:
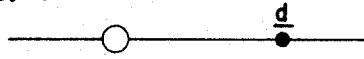
Figure 5:
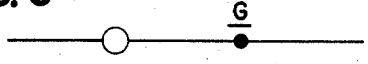
Figure 6:
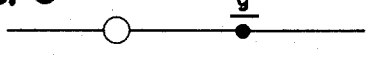
Figure 7:
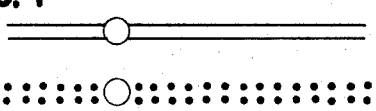
Figure 8:
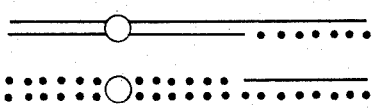
Figure 9:
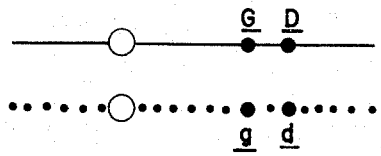
Figure 10:
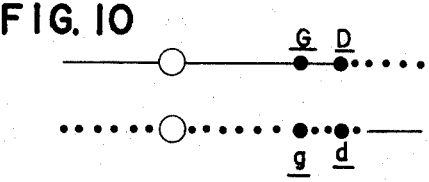
Figure 11:
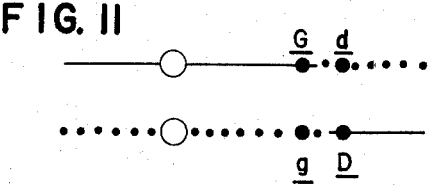
Figure 12:
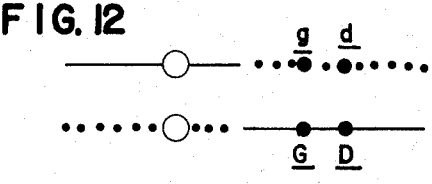
Figure 13:
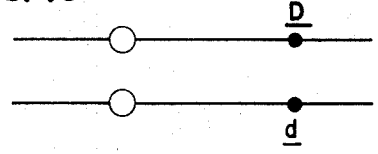

As previously indicated, some twenty different male sterile genes have to date been detected among the many genes of maize plants and in many instances their loci have been tentatively mapped. (Emerson, et. al., Cornell Memoir 180 (1935); Neuffer, et. al., "The mutants of maize." Crop Science Society of America Special Publication. Madison, Wisc. (1968)).

Table III lists male sterile genes which have been perpetuated, together with information on their chromosome locations.

TABLE III

| Designated Male Sterile Gene | Locus |
|---|---|
| as | Chromosome 1 |
| $ms_{17}$ | Chromosome 1, near locus of pericarp color gene (P) |
| $ms_9$ | Chromosome 1, near P locus |
| $ms_{12}$ | May be on chromosome 1 |
| $ms_{14}$ | Chromosome 1, near central region (centromere) |
| am | Chromosome 5 |
| $ms_5$ | Chromosome 5, proximal portion of long arm |
| $ms_{13}$ | Chromosome 5 |
| po (allelic to $ms_6$) | Chromosome 6, near tip of short arm |
| at | Chromosome 6, near locus of endosperm color gene ($Y_1$). |
| $ms_1$ | Chromosome 6 near $Y_1$ |
| $va_1$ | Chromosome 7 |
| $ms_7$ | Chromosome 7, long arm |
| $ms_8$ | Chromosome 8, long arm |
| $ms_2$ | Chromosome 9, proximal portion of long arm |
| $ms_{20}$ | Reported on chromosome 9 |
| $ms_{10}$ | Chromosome 10 |
| $ms_{11}$ | Chromosome 10 |

It should be noted that the listing in Table III is not claimed to be complete and it should be recognized that "new" male sterile genes are expected to be detected and mapped from time to time.

While any such male sterile gene may be employed in the procedures of the invention, not all will result in the derivation of an equally attractive final commercial product. Some male sterile genes, such as $va_1$ or $ms_{12}$ for example, may effect the expression of an incomplete degree of male sterility, e.g., some anthers may be exserted and some viable pollen may be produced by a plant homozygous for these particular genes in some genetic backgrounds. The expression of male sterility may also vary in response to environmental conditions. Some genes, such as as and po, may function to produce agronomically undesirable pleiotropic effects such as reduced seed production in addition to male sterility. As will be seen, due to the nature of the subject of the invention, such factors bear upon the commercial attractiveness of the use of any particular male sterile gene rather than upon the operativeness of the procedures of the invention.

According to the procedures of the invention, genetic stocks bearing a chromosomal aberration of the type earlier described, or from which the appropriate type may be derived, are selected for use in genetic combination with particular male sterile genes. Selection of chromosomal variations is made chiefly on the basis of two criteria.

The first criterion relates to differential transmission of deficient or duplicate-deficient chromosome complements as compared with normal or balanced chromosome complements. The commercially attractive applications of the procedures outlined here require that deficient or duplicate-deficient chromosome complements be egg-viable to some extent and that duplicate-deficient or heterozygous deficient zygotes be similarly viable since these conditions are requisite to maintenance and use of stocks which are described. At the same time, it is necessary that pollen carrying deficient or duplicate-deficient chromosome complements not function appreciably in effecting fertilization when in competition with pollen carrying a normal or balanced chromosome complement. It is also highly desirable that deficient or duplicate-deficient pollen be substantially non-functional even in the absence of such competition, as in the case of very sparse pollination.

It is not necessary, however, that all deficient or duplicate-deficient eggs or zygotes produced on an ear by viable. The consequence of some degree of inviability of either type would be a correspondingly reduced seed set on the ear (a certain level of "ear sterility"). Visible levels of ear sterility might, in fact, serve a useful purpose in providing corroborative evidence that plants on which such ears are borne are of duplicate-deficient or heterozygous deficient constitution. This feature might thus serve as an aid in monitoring the constitution of a plant at the time of harvest.

The manner of selection of chromosome aberrations that satisfy the differential transmissibility requirement of this first criterion includes consideration of information obtained from several sources. In some cases, there are published studies noting differential transmission associated with specific chromosome aberrations.

In other instances, evidence based on off-ratios of genetic markers and on appearance of pollen grains suggests that other chromosome aberrations display differential transmission that may be utilized in these procedures. Additional information of predictive value in selecting chromosome rearrangements of potential use in this regard may be derived from a consideration of the listings of cytological interchange points of chromosome rearrangements published in Crops Research Bulletin ARS 34–16, referred to earlier (Longley, 1961). In this connection, for example, it may reasonably be inferred that if a deficiency for a specific chromosome segment is egg-viable in one instance a deficiency for the corresponding segment when derived from a different chromosome aberration source is also likely to be egg-viable.

The second criterion employed in selection of chromosome aberrations for use in the invention relates to the positions of deficiencies and of interchange points of chromosome rearrangements with respect to particular male sterile gene loci.

The more closely linked an aberration is to a male sterile gene locus, the more commercially attractive the result of its use in the invention will be. It should be recalled in this respect that the more closely linked gene loci are, the less likely it will be that they may be separated by naturally occurring crossing-over.

Selection according to the second criterion includes consideration of the male sterile gene loci, such as set forth in Table III, with respect both to the expression of the male sterile characteristic and to the closeness of suitable genetic linkage with chromosome aberrations showing the desired transmission behavior.

I. THE USE OF CHROMOSOME DEFICIENCIES

The procedures of the invention are most easily understood through consideration of the use of chromosome aberrations in the form of simple terminal deficiencies. When such aberrations are employed, the following steps are followed to derive stocks used in the practice of the invention.

Seed stocks carrying a particular recessive male sterile gene allele and stocks carrying a particular chromosome deficiency are selected according to the criteria set forth above, i.e., differential transmission of the deficient chromosome and close genetic linkage of the deficiency to the male sterile gene locus.

Figure 28:
Figure 29:
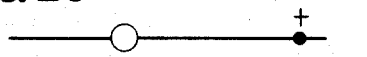

Illustratively, the particular male sterile gene might be at a locus four-fifths the distance from the centromere to the long arm tip of a particular chromosome (e.g., chromosome 1) and could be graphically represented as in FIG. 28. The deficiency chosen would be on the same numbered chromosome at a position just distal to the male sterile gene locus. A chromosome of this sort carrying the normal allele of the male sterile gene could be graphically represented as in FIG. 29.

An inbred line of maize, e.g., Oh43, is selected for "conversion" to the desired genotypes. In converting Oh43 to carry a particular recessive male sterile gene allele the following procedures of "continuous backcrossing" may be employed.

Male sterile plants (those homozygous for the recessive male sterile gene allele, $ms/ms$) may be pollinated by plants of Oh43. Since the pollen parent, Oh43, carries normal, or wild-type, alleles at the male sterile gene locus, its genotype may be represented as $+/+$. The progeny of the cross, which are termed the $F_1$ generation, are all of the genotype $ms/+$. The conversion program is continued by crossing these $F_1$ plants again to Oh43. Since both of these parents are pollen-fertile, the cross may be made in either direction. That is, either the $F_1$ plants or Oh43 plants may be used as male parents. Table IV is a Punnett Square representing the genotypes of the offspring from this first backcross to the recurrent parent, Oh43, in which Oh43 has arbitrarily been represented as the female parent.

TABLE IV

|   | + | ms |
|---|---|-----|
| + | +/+ | +/ms |

As indicated by TABLE IV, half the progeny in this backcross-1 generation will be homozygous for the normal gene allele and half will be heterozygous for the male sterile gene allele. All progeny, including the heterozygous progeny, will, of course, have received one representative of each homologous chromosome pair from the Oh43 inbred egg parent and the other representative of each such pair from the pollen parent. Since the genotypes of the many backcross-1 progeny seeds cannot be determined by examination of the seeds, representative samples of seed are planted out and resulting plants are "tested" for the heterozygous genotype and in the same generation are used in crosses to continue the program of conversion to Oh43.

While several alternative testing procedures might be employed, a commonly-used procedure comprises collecting pollen (in a labelled bag) from an individual plant grown from the backcross-1 seed, using part of the pollen sample to self-pollinate the plant of its origin and using part of the sample to pollinate silks of one ro more Oh43 plants. It is necessary to identify the individual plant source of a pollen sample on pollination bags placed over ears resulting from all such pollinations. This is usually accomplished by assigning a specific plant number to each such plant used as a pollen source for testing the genotypes of individual plants. It is seen from TABLE IV that statistically one-half the individual tested plants in backcross-1 progenies have the genotype $+/+$ and one-half have the desired genotype, $+/ms$. It is thus necessary in each generation to test a sufficient number of individual plants to be reasonably assured that at least one such tested plant is of the $+/ms$ genotype. Specific individual tested plants might be given arbitrary designations as plant 1, plant 2, plant 3, etc. In the following generation, seed resulting from self-pollination of designated plants would be planted, as would seed from continued conversion crosses borne on Oh43 plants that resulted from pollination by the same designated pollen parent plants.

If a particular tested backcross-1 progeny plant was of the homozygous normal type, no male sterile plants would appear among the progeny resulting from self-pollination. TABLE V shows that only male fertile progeny result from self-pollination of such a backcross-1 plant. The source seed for this family would thus be discarded as not carrying the recessive $ms$ allele.

TABLE V

|      | +    |
|------|------|
| +    | +/+  |

Backcross-2 progenies produced by pollinating Oh43 plants in the preceding generation with pollen from this same tested plant would likewise be discarded.

If a particular tested backcross-1 plant was heterozygous for the male sterile gene, one-fourth of the plant progeny resulting from self-pollination would exhibit male sterility. TABLE VI shows the genotypes resulting from self-pollination of such plants.

TABLE VI

|      | +     | ms     |
|------|-------|--------|
| +    | +/+   | +/ms   |
| ms   | ms/+  | ms/ms  |

Backcross-2 progenies produced by pollinating Oh43 plants in the preceding generation with pollen from a tested plant shown to have been +/ms would be used to continue the conversion program into backcross-3. The procedure would be a repeat of the testing procedure just outlined. That is, individual designated plants would be tested for their genotypic constitution at the ms locus by self-pollination and concurrently crossed again to the recurrent inbred parent, Oh43. Backcross-3 progenies containing plants of the required ms/+ constitution would be identified on the basis that an individual plant used as pollen parent to produce them was verified to be of ms/+ constitution as a result of tests of progenies produced by self-pollination.

This procedure might be repeated for as many as eight or nine generations. With each succeeding generation, the confirmed ms/+ offspring of the continued backcrossing to normal Oh43 would carry: (1) the recessive (ms) male sterile gene allele; (2) less of the genetic material originally contributed from the initial source stock of the ms gene allele; and, (3) more of the typical Oh43 genetic material. Due to expected separation through crossing over of the male sterile gene from all but the most closely linked genes on the chromosome on which it was originally borne, and replacement of the balance of the chromosomes, after eight or nine generations the resulting offspring would be substantially identical genetically to normal Oh43 but would bear the recessive male sterile gene allele and thus would be considered as converted.

In converting Oh43 to carry a particular chromosome deficiency, the following procedures of backcrossing are employed.

Plants of normal Oh43 are grown for use as pollen parents. Since Oh43 does not carry the deficient chromosome, its genotype may be designated N/N, with the letter N representing the normal chromosome form.

Figure 30:
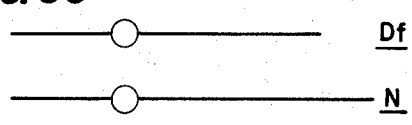

Plants heterozygous for the deficiency are used as female parents. Such plants may be designated by the genotype Df/N, with Df representing the deficient chromosome as shown in FIG. 30.

Pollen of Oh43 is used to pollinate plants carrying the deficiency. The genotypes of the resulting $F_1$ progeny may be represented as in TABLE VII.

TABLE VII

|      | N    |
|------|------|
| Df   | Df/N |
| N    | N/N  |

As shown in TABLE VII, half the $F_1$ plants are homozygous for the normal chromosome structure (N/N) and half are heterozygous for the deficiency (Df/N).

Sample seeds are grown out and the pollen types of the plants are examined. The heterozygous plants (Df/N) produce pollen of two genotypes in equal frequencies. Half the pollen carries the deficient chromosome and shows the pollen phenotype associated with this particular deficiency; the remaining pollen carries the normal homologue and shows normal pollen phenotype. The homozygous plants (N/N) will produce pollen of normal phenotype only. The heterozygous plants thus identified are used as egg parents for another pollination by normal Oh43.

This backcrossing procedure may be repeated for eight or nine generations with the end product being offspring which are substantially identical genetically to normal Oh43 but bearing the deficient chromosome.

A cross is then made between the Oh43 converted to bear the male sterile allele (ms/+) as pollen parent and Oh43 converted to bear the deficiency (Df/N) as egg parent.

Figure 31:
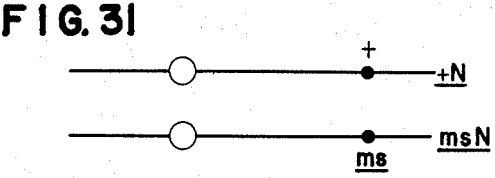

Illustratively, a number 1 chromosome pair in Oh43 plants heterozygous for the male sterile allele may be represented as in FIG. 31. Since these chromosomes have normal terminal segments distal to the male sterile gene locus (whether they bear + or ms alleles), the plant genotype may be represented as +N/msN.

Figure 32:
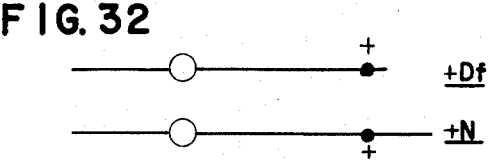

A number 1 chromosome pair in Oh43 plants converted to carry the deficiency distal to the male sterile gene locus may be represented as in FIG. 32. Since one member of the homologous chromosome pair carries the deficiency and the other is normal, and since both pair members would carry the normal male sterile gene allele, the genotype may be represented as +Df/+N.

The genotypes of the progeny of the above cross are shown in TABLE VIII.

TABLE VIII

|      | +N      | msN      |
|------|---------|----------|
| +Df  | +Df/+N  | +Df/msN  |
| +N   | +N/+N   | +N/msN   |

The progeny seed are thereafter "tested" to identify plants with the +Df/msN genotype. This is accomplished in part by growing out the seed and examining the pollen produced.

Plants of either the +N/+N genotype or the +N/msN genotype will produce only phenotypically normal pollen since neither of the chromosome 1 pair members in these plants carries the deficiency. These plants may be discarded.

Plants of either the +Df/+N genotype or the +Df/msN genotype will bear pollen half of which is phenotypically abnormal since, statistically, half the pollen grains produced on these plants will carry a deficient chromosome 1. In order to distinguish between plants of these two genotypes, it is necessary to observe progeny in the succeeding generation.

The genotypes of the progeny of self-pollinated +Df/+N plants are shown in TABLE IX. Note that pollen bearing the deficient chromosome is abnormal and does not function in fertilization. Therefore the only pollen type which participates in fertilization carries the +N chromosome. Egg cells bearing the deficiency, however, are viable, so both +N and +Df eggs are indicated.

TABLE IX

|      | +N     |
|------|--------|
| +N   | +N/+N  |
| +Df  | +Df/+N |

As shown by TABLE IX, if seed from the self-pollination of +Df/+N plants is grown out, none of the plants will exhibit male sterility. The plants which gave rise to such progeny may then be known to have had a +Df/aπN genotype, and seed produced on them by self-pollination may be discarded.

The genotypes of the progeny of self-pollinated +Df/msN plants are shown in TABLE X. Note again that pollen bearing the +Df chromosome does not function in fertilization while eggs of that constitution are viable.

TABLE X

|      | msN       |
|------|-----------|
| msN  | msN/msN   |
| +Df  | +Df/msN   |

As indicated by TABLE X, if seed from the self-pollination of +Df/msN plants is planted out, about one-half of the plants will be male sterile, having an msN/msN genotype. The balance, having a +Df/msN genotype will produce pollen of mixed normal and abnormal phenotypes, like the parent plant. The parent plants which gave rise to such progeny may then be known to have had a +Df/msN genotype.

Progenies produced by self-pollination of confirmed +Df/msN plants may be grown in isolation and the male sterile plants may be tagged, or otherwise marked, for identification at harvest time. The only pollen source for pollinating these isolated plants will be the +Df/msN plants in these progenies and the only pollen that will participate in fertilization will bear the msN combination.

The genotype of the progeny produced by pollination of the male sterile, msN/msN, plants by +Df/msN sib plants is shown in TABLE XI.

TABLE XI

|      | msN       |
|------|-----------|
| msN  | msN/msN   |

As indicated by TABLE XI, all progeny of the cross will be homozygous male sterile (msN/msN). Further, none will carry the deficiency. According to this scheme, all the seed produced on the male sterile plants will generate male sterile plants. Such seed may be used to plant rows of male sterile Oh43 for use in the production of commercial hybrid maize.

The genotypes of the progeny from the self-pollination of +Df/msN plants has been shown in TABLE X. Seeds from such self- (or sib-) pollinated male fertile plants in these isolated plantings may thus be used to produce more plants of the homozygous male sterile genotype as well as more plants of the parental +Df/msN genotype.

Figure 14:
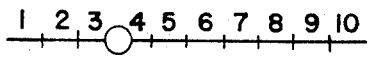
Figure 16:
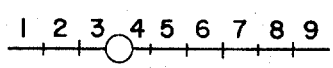
Figure 17:
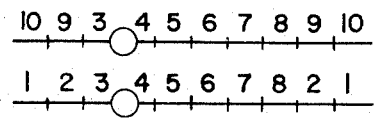
Figure 18:
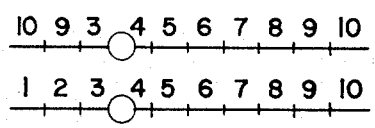
Figure 19:
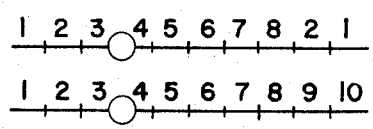
Figure 20:
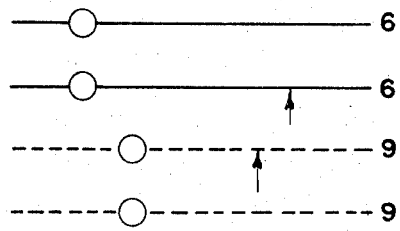
Figure 21:
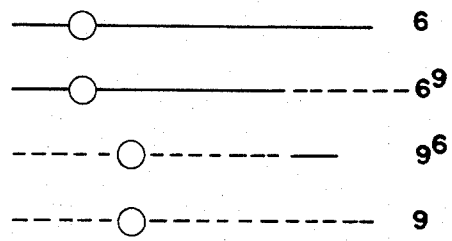
Figure 22:
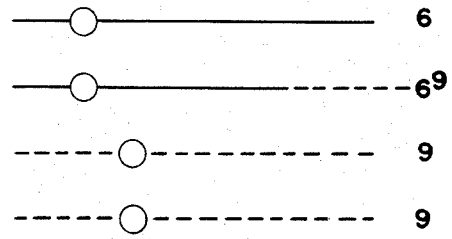
Figure 23:
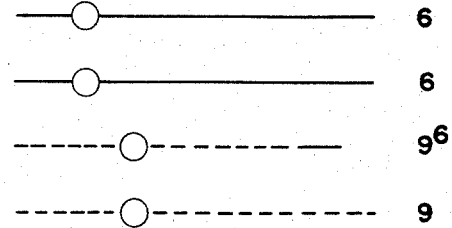

It was indicated earlier that either of two types of deficiencies might be used in the procedures outlined here. Discussion to this point has detailed use of one of these types, namely, terminal deficiencies, in which the male sterile gene locus must be closely linked in a proximal position with respect to the terminus of the deficiency. With regard to the normal chromosome constitution shown in FIG. 14, a chromosome with a simple terminal deficiency might be represented as in FIG. 16. In this case, in which chromosome segment 10 is represented as missing, the ms gene locus should be carried in segment 9 at a position very near the tip of the deficient chromosome.

Figure 15:
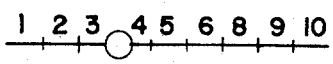

A chromosome deficient for segment 7 is represented in FIG. 15. In this instance of a simple internal chromosome deficiency, a male sterile gene locus immediately adjacent on either side of the deficient segment would be suitable for use in the procedures proposed here. That is, the male sterile gene locus might be carried either in segment 6 or in segment 8.

In order to simplify the explanation of these procedures, the presentation thus far has assumed complete linkage of a male sterile gene locus with the adjacent point of deficiency in +Df/msN plants. Recombination in this segment during meiosis results in the formation of recombinant chromatids of the constitutions +N and msDf. Both of these new combinations would be egg-viable, while the +N combination would be pollen-transmissible. Procedures by which the occurrence or effects of undesirable types of recombinant chromosomes might be minimized are discussed later.

II. THE USE OF DUPLICATE-DEFICIENT CHROMOSOMES DERIVED FROM HETEROZYGOUS PERICENTRIC INVERSIONS

Figure 33:
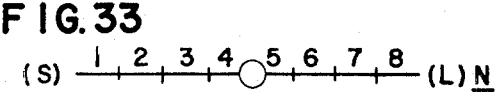
Figure 34:
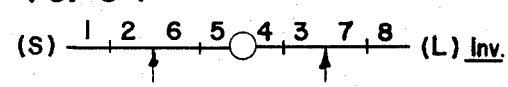

The nature of pericentric inversions and the constitutions of duplicate-deficient chromosomes which may be derived from them may be understood most simply through references to FIGS. 33 to 40. FIG. 33 shows a normal chromosome which has been divided into arbitrarily numbered segments. A terminal segment carried on the short arm of the normal chromosome is labelled (S); a terminal segment carried on the long arm of the normal chromosome is labelled (L). With reference to this same chromosome, FIG. 34 represents a pericentric inversion (Inv) in which the region between the arrows has been inverted and thus the segments included within it occur in reverse order compared with their sequence in the normal (standard form) chromosome. Since the centromere is included within the inverted section, this is termed a pericentric inversion. Inversions may arise by chromosome breakage at two points in a chromosome, followed by rejoining of the broken ends in a manner to yield a chromosome in which the region between the breakpoints has a reversed orientation with respect to the same region in a normally-arranged chromosome.

A chromosome carrying an inversion is normally fully pollen- and egg-transmissible since, while the sequence of chromosome segments has been changed, all segments are still present. The new chromosome is fully stable and thus may be transmitted generation after generation in its new form. A specific inversion, then, has occurred once as a result of chromosome breakage and reunion and thereafter has been perpetuated through subsequent generations.

If an egg carrying a chromosome in the standard form shown in FIG. 33 is fertilized by a sperm carrying the homologous inversion-bearing chromosome shown in FIG. 34, the resulting plant is heterozygous for the inversion. At the pachytene stage of meiosis in such a plant, homologous chromosome segments are intimately paired.

Figure 35:
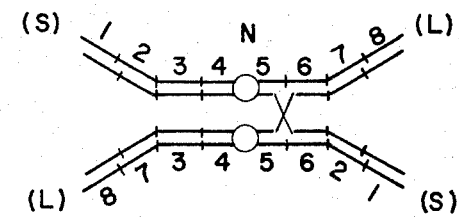

FIG. 35 represents diagrammatically the pairing relationship of this homologous chromosome pair at meiosis of megasporogenesis (preliminary to egg cell formation) in a plant heterozygous for the inversion (pairing is shown for only the chromosome region between the interchange points of the inversion). A chromatid exchange within the inverted region (shown by an "X" form) yields two types of duplicate-deficient chromatids among the meiotic products.

Figure 36:
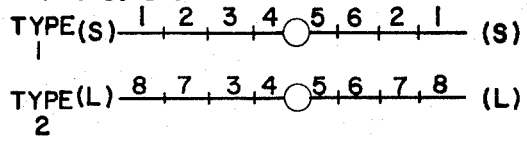

These two types of duplicate-deficient chromatids are shown in FIG. 36. A duplicate-deficient chromosome of Type 1 is deficient for a terminal segment of the long arm containing regions 7 and 8; it is duplicated for regions 1 and 2 of the short arm. Conversely, a duplicate-deficient chromosome of Type 2 is deficient for regions 1 and 2 of the short arm and is duplicated for regions 7 and 8 of the long arm. The two types of duplicate-deficient chromatids are reciprocal products of the same exchange.

Figure 37:
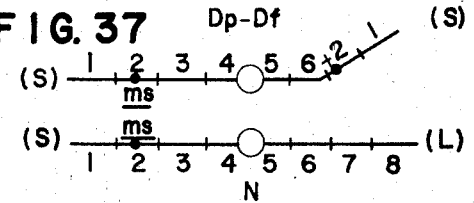
Figure 38:
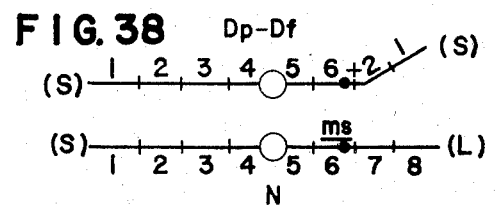

In some instances, chromosomes of Type 1 and/or Type 2 may be egg-transmitted but not pollen-transmitted. In these cases, certain linkage relationships of a male sterile gene locus relative to the deficient or duplicated segments may be used to effect differential transmission of male sterile gene alleles. If duplicate-deficient eggs carrying one or the other of the two types of duplicate-deficient chromosomes diagrammed in FIG. 36 are fertilized by normal sperm carrying this same chromosome in its standard form, the resulting duplicate-deficient plants are of two possible types. Each of these two types of duplicate-deficient plants might be used in the proposed procedure with two different alternative positions of a male sterile gene locus. The chromosomal constitutions and genetic marking in these various situations are indicated in FIGS. 37, 38, 39, and 40. In these figures, the symbol "Dp-Df" denotes a duplicate-deficient chromosome and the symbol N denotes its normally-arranged homologue. Plants carrying the chromosome constitution indicated in FIGS. 37 and 38 are heterozygous deficient for chromosome regions 7 and 8 and are triplicated for regions 1 and 2. Plants carrying the chromosome constitution indicated in FIGS. 39 and 40 are heterozygous deficient for chromosome regions 1 and 2 and are triplicated for regions 7 and 8. In each of the duplicate-deficient plant types, the duplicate-deficient chromosome which is present carries one of the two interchange points of the original inversion. In FIGS. 37 and 38 that interchange point is the junction of regions 2 and 6; in FIGS. 39 and 40, that interchange point is the junction of regions 3 and 7.

FIGS. 37 and 38 show two suitable alternative positions of a male sterile gene locus in plants heterozygous deficient for a terminal long arm segment and triplicated for a terminal short arm segment; with reference to FIG. 36, these plants carry a Type 1 duplicate-deficient chromosome. FIGS. 39 and 40 show the counterpart case, the two suitable alternative positions of a male sterile gene locus in plants heterozygous deficient for a terminal short arm segment and triplicated for a terminal long arm segment; with reference to FIG. 36, these plants carry a Type 2 duplicate-deficient chromosome.

In each of the situations of chromosome constitution and male sterile gene locus positions shown in FIGS. 37 through 40, the normal (or wild-type), male fertile allele of the male sterile gene locus is carried on the duplicate-deficient chromosome at a position immediately adjacent (one side or the other) to the single interchange point present in the chromosome. Any other representatives of the male sterile gene locus present in a plant carry the recessive ($ms$) allele. In FIG. 37, the male sterile gene locus is in region 2; in FIG. 38, it is in region 6; in FIG. 39, it is in region 7; and in FIG. 40, it is in region 3.

Duplicate-deficient chromosomes of the types shown in FIG. 36 would be selected that are substantially egg-viable but not pollen transmitted and that carry the normal allele of a male sterile gene locus closely linked (ideally, completely linked) to the adjacent interchange point in duplicate-deficient plants. Under conditions of complete linkage, if duplicate-deficient plants of the genotypes shown in FIGS. 37 through 40 are used as pollinators in testcrosses to male sterile plants, all plants in the progenies would be male sterile. Such progenies could therefore be used as plantings of male sterile female rows in foundation and production fields. Self- or sib-pollinations of these duplicate-deficient plants yield progenies containing male sterile plants and male fertile duplicate-deficient plants of the parental type. Such progenies, therefore, may be used as pollinator rows. Crossing and stock maintenance procedures are thus essentially the same as were described earlier for stocks employing simple deficiencies.

The same two chief criteria are employed in selecting duplicate-deficient chromosomes for use with this procedure as are employed in selecting simple deficiencies, i.e., there must be close linkage between a male sterile gene locus and the point of interchange in the selected duplicate-deficient chromosome and, additionally, the duplicate-deficient chromosome must be substantially egg-transmitted but not pollen-transmitted.

In the course of deriving duplicate-deficient stocks in the background of an inbred line, it would frequently be easier to use plants heterozygous for the inversion as pollen parents in each generation of the conversion program. In this way, the progeny will be of two types in equal frequency in each generation--plants carrying only normally-arranged chromosomes and plants heterozygous for the inversion. The former plants have normal-appearing pollen. The latter produce aneuploid (duplicate-deficient) pollen in a proportion that is a direct measure of the frequency of recombination between the points of inversion, and thus varies with the genetic length of different inversions (Morgan, D. T., Genetics 35:153–74 (1950)). The phenotypes of duplicate-deficient pollen grains presumably reflect their genic contents. In various instances, they may be clearly abortive, sub-normal, or virtually normal in appearance.

At the end of conversion, when it is desired to derive duplicate-deficient plants, heterozygous inversion plants must, of course, be used as female parents if duplicate-deficient chromosomes are female-transmissible only.

It might also be possible to conduct the conversion program to an inbred line using duplicate-deficient plants in each generation. If this procedure were used, there should be a clearly-discernable phenotype associated with pollen carrying the duplicate-deficient chromosome in order that duplicate-deficient plants for use in continuing the conversion in each generation could be easily identified by pollen examination.

As outlined previously, recombination between the interchange points in a plant heterozygous for a pericentric inversion yields two types of duplicate-deficient chromosomes. Frequently, only one of these types would be egg-viable; the other type, in addition to being egg-inviable, would in general be more likely to result in a distinctive phenotype (abortive or sub-normal appearance) in pollen grains in which it occurred. Thus, plants heterozygous for an inversion might be readily identified in segregating progenies on the basis of a distinctive pollen phenotype associated with a non-transmissible duplicate-deficient genotype among the pollen produced. If in the conversion of a pericentric inversion to an inbred line, plants heterozygous for the inversion were used as pollen parents in each generation, appropriate plants for continuation of conversion would thus be identified more easily by pollen examination.

Derivation of stocks is similar to that earlier described for simple deficiencies. Commercial inbred lines would be converted to carry a selected recessive male sterile gene allele by the continuous backcross conversion procedures previously outlined. At the end of conversion, plants would be self-pollinated to yield male sterile progeny plants. Stocks could be perpetuated by crossing $ms/ms$ by $ms/+$ genotype sibling plants.

The same inbred lines would be converted to carry a selected pericentric inversion by a continuous backcrossing procedure in which plants heterozygous for the inversion might preferably be used as male parents in each generation. At the end of both conversion programs, stocks would be intercrossed to derive duplicate-deficient plants of one of the appropriate genotypes indicated in FIGS. 37 through 40.

To derive duplicate-deficient plants of an inbred line, e.g., Oh43, having the genotypic marking shown in FIG. 38 or that shown in FIG. 40, plants of Oh43 heterozygous for the inversion and carrying only normal alleles of the $ms$ locus would be crossed as female parents with plants of Oh43 that were heterozygous for the recessive $ms$ allele. The cross would therefore be as follows: +N/+Inv by $ms$N/+N. Some plants of the appropriate genotype (FIGS. 38 and 40) would appear in the immediate progeny. In order to identify these, numbered plants recognized as duplicate-deficient by pollen classification (50 percent sub-normal or abortive pollen) would be self-pollinated and concurrently testcrossed to male sterile Oh43 plants. A tested plant which was of the appropriate genotype would yield virtually all male sterile testcross progeny. Seed from such a testcross represents the initial source for planting rows of male sterile Oh43 plants for use in foundation and production fields. Seed from the self-pollination of the same tested plant is the source for planting pollinator rows which include plants of the same parental genotype.

Duplicate-deficient plants having the genotypic marking shown in FIGS. 37 and 39 are triplicated for the male sterile gene locus. The gene dosage in these plants is $+/ms/ms$, with the single normal allele carried in the duplicate-deficient chromosome at a position adjacent to the single interchange point present in this chromosome. Duplicate-deficient plants of Oh43 carrying these genotypic markings may be derived in the following manner.

The same procedures as were outlined above are used to derive the recessive $ms$ gene allele in Oh43 and separately to derive a selected pericentric inversion in Oh43. Then male sterile Oh43 plants are crossed by Oh43 plants carrying the inversion to yield plants heterozygous for the inversion and heterozygous for the recessive $ms$ allele at the same time. These plants (recognized by the pollen phenotypes characteristic of this particular inversion) are then pollinated by Oh43 plants heterozygous for the recessive $ms$ allele. This last cross may be shown as follows: $ms$ N/+Inv by $ms$ N/+N. Some plants of the appropriate genotype would appear in the immediate progeny. These are recognized and stocks are established by the same procedures outlined for the genotypes represented in FIGS. 38 and 40.

If a female parent having the constitution $ms$ N/+$Inv$ is used in the step at which duplicate-deficient chromosomes are derived, the crossover event that yields the duplicate-deficient recombinant chromatid simultaneously introduces the appropriate genetic marking needed in duplicate-deficient plants carrying the male sterile gene locus in a triplicated segment. The duplicate-deficient chromosome thus carries the + allele at the male sterile gene locus adjacent to the interchange point and the $ms$ allele at the second locus in this chromosome. The $ms$ allele on the homologous normal chromosome is derived from one of the two normal homologues of the male parent.

It should be noted that the original pericentric inversion chromosome is fully egg- and pollen-transmissible. Such a chromosome can therefore be transferred into any type of cytoplasm. Heretofore, little attention has been given to distinguishing among various "normal" (that is, non-sterile) cytoplasms. If, however, future investigations reveal differences among various non-sterile cytoplasms that are commercially important, it would prove advantageous to be able to transfer pericentric inversion chromosomes readily into such various alternative cytoplasms.

If deficiencies for tip segments of chromosomes are to be egg-viable, the length of such deficiencies must in general be relatively short. With regard to pericentric inversions usable in the procedures outlined here, one interchange point would thus be near the end of a chromosome arm and the second interchange point of the inversion would be in the opposite chromosome arm. In most cases, then, the inverted segment would be rather long. In plants heterozygous for inversions of considerable genetic length, duplicate-deficient chromatids are produced rather frequently as a result of recombination within the inverted segment. This constitutes one of the distinct advantages of pericentric inversions for the proposed uses, since it would be relatively easy to derive a duplicate-deficient chromosome from a plant heterozygous for such an inversion.

In one instance, that of Inversion 9a, it is known that both duplicate-deficient chromatids that arise as reciprocal products of recombination within the inverted segment are egg-transmissible (Rhoades, et al. Maize Genetics Cooperation Newsletter 31:76–77 (1957)).

III. THE USE OF DUPLICATE-DEFICIENT CHROMOSOME COMPLEMENTS DERIVED FROM HETEROZYGOUS RECIPROCAL TRANSLOCATIONS

There are specific requirements with respect to a suitable reciprocal translocation and with respect to the location of a particular male sterile gene locus to be used in conjunction with it. As a type example, consider a plant heterozygous for a reciprocal translocation between chromosomes 6 and 9, in which one interchange point is near the tip of the long arm of chromosome 6 (FIG. 41).

The meiotic prophase pairing configuration of the rearranged chromosomes in a plant of this constitution is shown in FIG. 42. For simplicity, the division of each chromosome into its component sister chromatids is not shown. Symbols $a$ and $b$ represent alternative sites of a male sterile ($ms$) gene locus for use in procedures outlined here.

During meiosis in a plant of this constitution, if homologous centromeres disjoin and if there is random assortment of non-homologous centromeres, the following combinations of these chromosomes would be assorted in equal frequencies: 6 9, $6^9$ $9^6$, 6 $9^6$, and $6^9$ 9. Two of these combinations (6 9 and $6^9$ $9^6$) contain all chromosome segments that are normally present; both of these combinations are normally fully egg- and pollen-transmissible. The remaining two combinations (6 $9^6$ and $6^9$ 9) in each case consist of a combination of a normally-arranged chromosome with an interchanged chromosome. Such combinations are duplicate-deficient; there is duplication for one chromosome segment and deficiency for another. In most reciprocal translocations, both of these combinations are inviable, so that plants heterozygous for a reciprocal translocation typically display about fifty percent egg abortion and fifty percent pollen abortion. However, in some reciprocal translocations having an interchange point near the tip of a chromosome arm, a duplicate-deficient chromosome complement lacking that tip segment may still be egg-viable.

In the type example shown in FIG. 41, the interchange point in chromosome 6 is near the tip of the long arm. In this circumstance, duplicate-deficient eggs carrying the $6^9$ 9 combination of chromosomes may be viable. Such eggs are deficient for the chromosome segment distal to the point of translocation in chromosome 6 and are duplicated for the chromosome segment distal to the point of translocation in chromosome 9. If these eggs are fertilized by normal sperm (6 9), the resulting plants are duplicate-deficient ($6^9$ 9/6 9); they are hemizygous (only one locus present) for gene loci distal to the translocation point in chromosome 6 and triplicated for loci distal to the translocation point in chromosome 9.

Microspores (from which mature pollen grains develop) produced by such a duplicate-deficient plant are primarily of two constitutions with respect to these chromosomes, (1) $6^9$ 9 or, (2) 6 9. Since pollen of constitution (1) contains a duplicate-deficient chromosome complement, it rarely, if ever, functions in competition with the balanced constitution (2). A male sterile gene locus on the $6^9$ chromosome immediately adjacent (on either side) to the interchange point (alternative $a$ or $b$ in FIG. 42) and completely linked with it would therefore not be transmitted under conditions of competition between the above two pollen types.

Eggs produced by such a duplicate-deficient plant are primarily of the same two types with regard to these chromosomes, (1) $6^9$ 9 or, (2) 6 9. The relative proportion of functioning eggs of the two constitutions depends upon at least two factors, (1) whether or not there is preferential segregation of the 6 or $6^9$ chromosome to the megaspore, and (2) the viability of duplicate-deficient eggs.

In the procedures proposed here, duplicate-deficient plants having either of two genotypes might be used (FIGS. 43 and 44). In either case, the normal allele of the male sterile ($ms$) gene would be carried on the single interchanged chromosome and should occupy a position that ideally is completely linked with the point of interchange. With regard to the single rearranged chromosome present in gametes or plants carrying the duplicate-deficient chromosome complement, the male sterile gene locus may be either just proximal to the interchange point or just distal to the interchange point.

In the first case (FIG. 43), the gene is located in the chromosome which lacks its usual tip segment; as here depicted, it is thus a chromosome 6 male sterile gene locus which is closely linked to a terminal deficiency. Male sterile genes having this position relative to an interchange point must necessarily be located fairly near the tips of the chromosome arms, since if duplicate-deficient chromosome complements are to be egg-transmissible, the extent of the deficiency must be restricted in general to a relatively short tip segment of a chromosome arm.

In the second case (FIG. 44), the male sterile gene locus is carried in a chromosome segment that is duplicated in duplicate-deficient eggs and is triplicated in duplicate-deficient plants. In a reciprocal translocation having one interchange point adjacent to a centromere, such a chromosome segment would as an upper limit be the length of an entire chromosome arm. Some of the male sterile gene loci which appear most promising for use in this proposed technique appear on the basis of present information to be situated a considerable distance from the tips of chromosome arms, and, in some cases, are fairly near to centromeres. In nearly all these instances, if such loci are to be used in the procedures outlined here, the male sterile gene locus would be carried on a triplicated segment in duplicate-deficient plants. The necessary dosage relationship of male sterile gene alleles required in triplicated segments is $+/ms/ms$. For use with the procedures outlined here, it is necessary that duplicate-deficient plants having this genotype be male-fertile.

Male fertile plants of the genotype shown in FIG. 43 when self-pollinated yield progeny which include male fertile (parental type) and male sterile plants, as shown in TABLE XII. These progenies are suitable for use as pollinator rows in foundation fields.

TABLE XII

|  | 6ms 9 |
|---|---|
| $6^9 + 9$ | $6^9 + 9/\ 6ms\ 9$ |
| 6ms 9 | 6ms 9/ 6ms 9 |

The same duplicate-deficient plants when used as male parents in testcrosses to male sterile plants yield male sterile progenies for use as female rows of male sterile plants in foundation and production fields, as shown in TABLE XIII.

TABLE XIII

|  | 6ms 9 |
|---|---|
| 6ms 9 | 6ms 9/ 6ms 9 |

Similarly, male fertile plants of the genotype shown in FIG. 44 when self-pollinated yield progeny suitable for use as pollinator rows in foundation fields, as shown in TABLE XIV.

TABLE XIV

|  | 6 9ms |
|---|---|
| $6^9 + 9ms$ | $6^9 + 9ms/6\ 9ms$ |
| 6 9ms | 6 9ms/6 9ms |

The same duplicate-deficient plants when used as male parents in crosses to male sterile plants yield progenies of male sterile plants for use as female rows in foundation and production fields, as shown in TABLE XV.

TABLE XV

|  | 6 9ms |
|---|---|
| 6 9ms | 6 9ms/6 9ms |

Thus, the maintenance and use of these stocks is again essentially the same as was described earlier for procedures involving simple deficiencies or duplicate-deficient chromosome complements derived from pericentric inversions.

IV. SCREENING PROCEDURES

In a preliminary screening of reciprocal translocations to be used in these procedures, reciprocal translocations would be selected for study that (1) are known to yield egg-transmissible duplicate-deficient chromosome complements, or that have a reasonable probability of doing so, either on the basis of previous information or by virtue of the cytological positions of their interchange points and (2) have a good chance of having an interchange point favorably located with respect to a suitable male sterile gene locus. The screening procedure in individual instances differs depending upon whether a specific translocation is likely to be used in the genotypic situation shown in FIG. 43 or that shown in FIG. 44. Suggested procedures in each of these alternative situations are outlined below. It should be understood that the details of these procedures are not inflexible, and that variations of these procedures might be employed.

A. Screening Procedure to Identify a Male Sterile Gene Locus Proximal To The Terminal Deficiency In a Duplicate-Deficient Plant Plants heterozygous for a reciprocal translocation (and carrying only normal alleles of male sterile gene loci) are pollinated by plants heterozygous for a recessive male sterile gene allele. The appearance of male sterile plants in the $F_1$ progeny is prima facie evidence that these male sterile plants are duplicate-deficient and hemizygous male sterile (designated $-/ms$ with - indicating the absence of the corresponding locus in the homologous chromosome); this particular combination of reciprocal translocation and male sterile gene locus would be rejected from further consideration for purposes outlined here since the male sterile gene would in this instance be located within the deficient segment (rare exceptions might be made if there were evidence, or probability, that two different duplicate-deficient complements were transmitted from this particular reciprocal translocation stock). Three useful pieces of information would result from this outcome, however; (1) it would indicate that this specific reciprocal translocation stock yields a transmissible duplicate-deficient chromosome complement, (2) it would provide information on the cytological position of the male sterile gene locus, and (3) it would focus attention on testing those reciprocal translocations having an interchange point located more distally in the same chromosome arm.

If progenies from the crosses indicated above did not include male sterile plants, then individual plants in these progenies would be examined for pollen phenotypes characteristic of duplication-deficiency. About half of the plants so identified would be expected to be heterozygous for the male sterile gene. Several duplicate-deficient plants in each family would be crossed as male parents to male sterile testers and their progenies would be grown out to detect instances of preferential transmission of the recessive male sterile gene allele. In the desired situation, the plants in these testcross progenies would be all, or virtually all, male sterile. They would represent cases in which duplicate-deficient plants carried a male sterile gene locus closely-linked in a proximal position to an interchange point delimiting a terminal deficiency. Such plants would have a genotype analogous to that shown in FIG. 43.

B. Screening Procedure To Identify a Male Sterile Gene Locus Carried in The Triplicated Segment in a Duplicate-Deficient Plant As used in the following procedures, the pedigree symbol "T" designates the chromosome combination, $6^9\ 9^6$; the alternative, that is, 6 9 is designated by "N."

Step 1. Pollinate male sterile plants by plants carrying, or homozygous for, an appropriate reciprocal translocation: $msN/msN$ by $+T/+T$.

Step 2. Pollinate the resulting semi-sterile $F_1$ plants by plants heterozygous for the male sterile gene: $ms\ N/+T$ by $msN/+/+N$.

Step 3. Identify pollen-fertile duplicate-deficient plants among the progeny by pollen phenotypes and testcross several such plants in each family to male sterile testers to identify plants which received recessive $ms$ gene from the pollen parent.

Step 4. Grow out the progenies and count male-fertile and male-sterile plants in each to detect instances of preferential transmission of the recessive male sterile gene allele. In the desired situation, the plants in these testcross progenies will be all, or virtually all, male sterile. Duplicate-deficient plants of the desired type that were identified by these procedures would have a genotype analagous to that shown in FIG. 44.

As soon as a suitable specific combination of a reciprocal translocation and a closely-linked male sterile gene locus has been selected, convert the reciprocal translocation and the male sterile gene allele individually to commercial inbred lines that will be used in the female parentage of commercial hybrid maize.

The procedures outlined above require indentification of duplicate-deficient plants by pollen phenotypes. Plants heterozygous for a reciprocal translocation that exhibits regular centromere disjunction produce pollen of usually three distinguishable phenotypes. Pollen produced by duplicate-deficient plants derived from the same reciprocal translocation stock exhibits only two of these same three phenotypes. The reasons for this difference will become evident after references to FIGS. 42 and 43.

Figure 24:
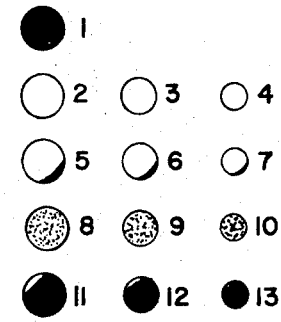
Figure 25:
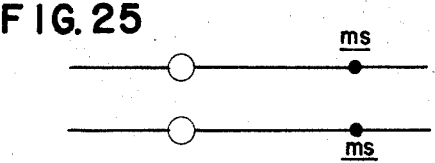
Figure 26:
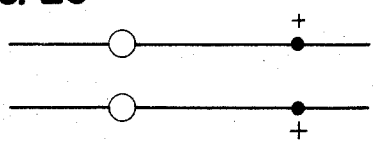
Figure 27:
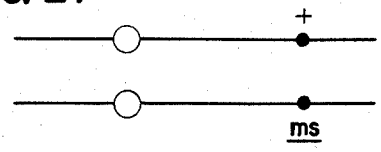

The meiotic pairing relationship of rearranged chromosomes in a plant heterozygous for a reciprocal translocation is shown in FIG. 42. During microsporogenesis, if homologous centromeres disjoin and if the non-homologous centromeres shown segregate at random with respect to each other, then pollen which is produced is expected to exhibit three distinguishable phenotypes relatable to four different chromosome constitutions with respect to these chromosomes:

1. One-half of the pollen is expected to be normal in appearance, e.g., grain 1 in FIG. 24, and functioning and to consist in equal proportions of pollen grains of the constitutions 6 9 and $6^9 9^6$.

2. One-quarter of the pollen is expected to be of the constitution $6^9$ 9. In the earlier discussion of FIG. 42, this chromosome constitution was postulated as being egg-transmissible. Usually, a duplicate-deficient complement that is egg-viable results in a pollen phenotype that is more accurately described as "sub-normal," e.g., grains 5–13 in FIG. 24, than as "abortive," e.g., grains 2–4 in FIG. 24. Typically, pollen grains of this genotype contain visible amounts of starch but are usually incompletely filled; they are usually also somewhat smaller than normal (euploid) pollen grains produced by the same plant.

3. One-quarter of the pollen is expected to be of the constitution 6 $9^6$. If the deficient segment is long, this pollen is ordinarily clearly abortive in appearance, being devoid, or nearly so, of starch, e.g., grains 2–4 in FIG. 24.

Plants of the duplicate-deficient constitution shown in FIG. 43 produce pollen largely of two genotypes (and phenotypes):

1. One-half of the pollen is normal in appearance and functioning and is of the constitution 6 9 with respect to the chromosomes shown.

2. One-half of the pollen is of the constitution $6^9$ 9 and exhibits the phenotype associated with pollen grains of this same chromosome constitution that are produced by plants heterozygous for the same reciprocal translocation (pollen of phenotype 2, above).

Duplicate-deficient plants do not produce pollen of the clearly-abortive type associated with the chromosomal constitution 6 $9^6$ (type 3, above) since these plants do not carry a $9^6$ chromosome.

The preliminary screening program to identify suitable combinations of duplicate-deficient complements and male sterile gene loci can be conducted more easily and more efficiently in many instances through the use of recessive, non-lethal marker genes located near chromosome tips. Duplicate-deficient plants of the chromosome constitution shown in FIGS. 43 and 44 carry a deficiency for a tip region of chromosome 6; they are therefore hemizygous for all gene loci in this segment. Any recessive marker gene ($m$) that is carried in this segment in duplicate--deficient plants would be represented in hemizygous condition ($-/m$) and the recessive gene phenotype would be expressed.

Various combinations of male sterile gene loci and marker genes near the tips of chromosome arms are being synthesized in order to obtain plants known to be of the generalized genotype $ms/+$ $m/m$ for use in the screening program. Plants of this genotype could be used as male parents in the first cross indicated under screening procedure A and in Step 2 under screening procedure B as described earlier. All duplicate-deficient plants among the progeny would then be recognized by their expression of the recessive marker gene phenotype, and it would not be necessary to identify them by their pollen phenotypes. This same use of a recessive marker gene might also be applied in screening procedures to identify plants carrying simple deficiencies or duplicate-deficient chromosome complements arising from heterozygous pericentric inversions.

The preceding discussion has assumed the availability of suitable marker gene loci within deficient segments. In many cases, however, marker genes might be used that occupy positions proximal to, rather than within, deficient terminal segments. In these instances, differential transmission of marker gene alleles in testcrosses of duplicate-deficient plants to marker gene testers would provide information useful in selecting appropriate testcross progenies for determining differential transmission of alleles at male sterile gene loci.

As soon as a suitable specific combination of a male sterile gene locus and a reciprocal translocation to be used in conjunction with it has been identified, the recessive male sterile gene allele and the reciprocal translocation are converted separately to selected inbred lines. Conversion of the male sterile gene allele is carried out by the procedure previously outlined.

A selected reciprocal translocation may be converted to a particular inbred line, e.g., Oh43, by continuous backcrossing, using N/T (semi-sterile) plants as male parents in each generation.

At the end of conversion, if the $ms$ locus is proximal to the interchange point in the rearranged chromosome present in duplicate-deficient plants, pollinate heterozygous translocation (N/T) plants (Oh43-converted) by $ms/+$ plants (Oh43-converted). Some progeny will be duplicate-deficient and heterozygous $ms$. To identify these, self-pollinate duplicate-deficient plants (recognized by pollen phenotypes) and cross each as male parent to male sterile Oh43 plants. Plants of the desired genotype when self-pollinated will yield progeny that segregate fertile and male-sterile plants in approximately a 1:1 ratio (if duplicate-deficient eggs function with reduced frequency, there will be an excess of male sterile progeny); the same plants when used as male parents on male sterile testers will yield all, or virtually all, male sterile progeny.

If the *ms* locus is carried on the triplicated segment in duplicate-deficient plants (i.e., is distal to the interchange point on the rearranged chromosome present in duplicate-deficient plants), pollinate male sterile plants (Oh43-converted) by heterozygous translocation (N/T) plants (Oh43-converted); then pollinate semi-sterile plants in the progeny by *ms*N/+N plants (Oh43-converted). Identification of duplicate-deficient plants of the desired type in the progeny then proceeds as outlined in the preceding paragraph.

In the discussion of FIG. 42, it was pointed out that if homologous centromeres disjoin and if non-homologous centromeres assort at random, about one-quarter of the eggs that are formed are expected to be of the constitution $6^9$ 9 with respect to the chromosomes shown. There is some evidence, however, that some reciprocal translocations having an interchange point very near the tip of a chromosome arm do not exhibit this random assortment of non-homologous centromeres in plants heterozygous for the reciprocal translocation, but rather give a preponderance of alternate disjunction, which in this example would yield eggs mostly of the constitutions 6 9 or $6^9 9^6$. It may be seen that if this were true, the isolation of duplicate-deficient chromosome complements from plants heterozygous for a reciprocal translocation might be more difficult. In these instances, the isolation of a duplicate-deficient chromosome complement would be facilitated through the use of a recessive marker gene in the deficient segment such that rare duplicate-deficient plants in progenies might be recognized by the marker gene phenotype being expressed in hemizygous condition (−/m). Procedures for conversion of stocks and extraction of duplicate-deficient chromosome complements carrying the appropriate marking of *ms* gene alleles might then be modified so that the duplicate-deficient chromosome complement would be first isolated using the marker gene phenotype, then conversion to an inbred background would be conducted by using duplicate-deficient plants in each generation as female parents. It should be noted that about one-half the eggs formed by a duplicate-deficient plant are expected to be duplicate-deficient, if there is no preferential segregation of the interchanged chromosome or its homologue in megasporogenesis.

Some modification of procedures might also be necessary if heterozygous deficient or duplicate-deficient plants are not easily identifiable by pollen phenotypes. In some cases, deficient or duplicate-deficient pollen may not be clearly differentiable visually from pollen carrying a balanced chromosome complement that is produced by the same plant. In these instances, identification of heterozygous deficient or duplicate-deficient plants may be effected by a procedure similar to that used in identifying *ms*/+ plants in each generation of a conversion program. For example, plants of the constitution + D*f*/*ms* N or + D*p*−D*f*/*ms* N (or +/*ms*/*ms*) would be identified by the fact that when used as male parents in crosses to male sterile plants, virtually all progeny would be male sterile. To convert stocks of this sort to an inbred line, e.g., Oh43, it would be necessary first to derive Oh43 converted to carry the recessive male sterile gene allele. The conversion program could then be carried out by using *ms*/+ Oh43 plants as male parents in each generation and identifying progenies containing duplicate-deficient plants of the appropriate constitution for continued conversion by the results of testcrosses of individual, numbered plants made the previous generation.

In some cases, heterozygous deficient or duplicate-deficient plants may show a characteristic phenotype that may be used as an aid in their identification. Commonly, such plants are somewhat shorter and may be a few days later in anther exsertion than sib plants carrying the normal, balanced chromosome complement.

Earlier, reference was made to factors of commercial attractiveness that would affect the choice of stocks to be used in these procedures. With regard to the choice of a male sterile gene, it is obviously important that plants homozygous for the recessive male sterile allele remain male sterile in a wide variety of genetic backgrounds and environments. If, for example, rows of male sterile Oh43 are grown adjacent to male fertile rows of R802A for the purpose of producing seed of the hybrid (Oh43 × R802A), it would be commercially undesirable for the Oh43 plants to shed viable pollen since some of the seed borne on Oh43 plants would then have resulted from self- or sib-pollination and, when grown, would yield male sterile Oh43 plants.

Certain pleiotropic manifestations associated with the expression of male sterile genes might also be agronomically undesirable in foundation and production fields. The reduced seed set commonly found on ears of plants homozygous for *po* was cited earlier as an example.

Pollen carrying deficient or duplicate-deficient chromosome complements should preferably be non-functioning even in the absence of pollen competition, since under field conditions there are times when the total pollen shed is of restricted amount.

Linkage between a male sterile gene locus and an adjacent point of deficiency in heterozygous deficient or duplicate-deficient plants should ideally be complete. In practice, complete linkage is not expected, but a major criterion for selection of stocks would be to achieve the minimum amount of recombination in this segment that is attainable.

It may be seen that the critical feature in these procedures consists of maintaining the proper genotype in the male fertile plants in pollinator rows in foundation fields. In a plant of the genotype + D*f*/*ms* N, recombination between the male sterile gene locus and the point of deficiency results in recombinant chromosomes of the constitution + N and *ms* D*f*. Pollen carrying the first combination would be functional, while eggs carrying either combination would be viable.

If pollen carrying the + + combination functions in the fertilization of eggs of male sterile plants, male fertile progeny (*ms*/+) are produced. When rows of male sterile plants derived by these procedures are grown in isolation in foundation or production fields for use as female parents, seedsmen might monitor the plantings and detassel such rare male fertile plants.

Some male fertile plants in pollinator rows may have a genotype other than + Df/ms N, as a result of their origin from recombinant gametes. For example, a plant of the genotype + N/ms N would produce functioning pollen, half of which would transmit the normal (+) allele of the male sterile gene locus. Certain plants of undesirable genotype might be recognized and removed from pollinator rows. For example, if heterozygous deficient or duplicate-deficient plants in pollinator rows had a recognizable plant phenotype such as reduced stature and delayed anther exsertion, any male fertile, tall, early shedding plants in pollinator rows might be removed on the assumption they were not deficient or duplicate-deficient.

It is important that plants of undesirably genotype in pollinator rows not participate in the production of seed increase for planting additional pollinator rows. This result might best be achieved by maintaining what may be called "breeder's stocks" of pollinator row seed.

Seed of "breeder's stocks" would be produced by self-pollination of plants verified to be of the appropriate genotype by testcrossing. In this procedure, individual numbered plants would be self-pollinated and concurrently testcrossed to male sterile plants. Samples of seed from the testcross would then be grown to verify that all, or virtually all, of the testcross progeny were male sterile. Seed derived from self-pollination of plants confirmed to be of the appropriate genotype would then be saved for use in planting future pollinator rows.

The undesirable consequences of recombination in the $ms$—$Df$ segment might be alleviated by further reducing crossing over in this segment. This might be accomplished, for example, by introducing a short paracentric inversion (an inversion which does not include a centromere) or another deficiency at a position on the opposite side of the male sterile gene locus from the existing deficient segment. If an appropriate short paracentric inversion or deficiency were available in stock, it might be introduced into association with the previous deficient segment by crossing over. It might also be feasible to employ mutagens to induce a second deficiency in this position in the existing deficient chromosome. A screening procedure to detect induction of a deficiency in the appropriate position might make use of a recessive marker gene that would express the mutant marker gene phenotype in hemizygous condition (—/$m$) whenever a deficiency that included the marker gene locus were induced.

If the second deficient segment satisfied the same criteria as the first, of course, it would serve to prevent pollen transmission of the products of recombination on either side of the male sterile gene locus. To be used for this purpose, however, a chromosome carrying either or both deficient segments would need to be egg-viable but not pollen-transmitted. It would probably prove impractical to verify that stocks contained a chromosome carrying both deficient segments. Rather, the primary use of a chromosome carrrying a deficient segment on either side of a male sterile gene locus might be to interfere with pairing of the segment between the deficiencies and thus to drastically reduce, or effectively prevent, crossing over in that segment.

Control at still a different level might be achieved by utilizing a short paracentric inversion which included a segment carrying a suitable male sterile gene locus. By means of mutagens and through use of a recessive marker gene as outlined earlier, a deficient segment might be induced and recognized within the inverted segment at a position adjacent to the male sterile gene locus. In a plant heterozygous for a paracentric inversion, recombination between the points of interchange leads to the production of dicentric and acentric chromatids. Aberrant chromosome types arising in this way would ordinarily not be pollen-transmitted. In some instances, it has been reported that such recombinant chromatids are not assorted to the megaspore; in other instances, there is evidence that they may be. However, in any case, aberrant chromosome types arising in this way would ordinarily render eggs inviable that contained them if deficient segments were long. In this instance, the non-transmissibility of recombinant chromatids would be the result of the generation of new kinds of chromosome deficiency as the result of crossing over. As a result, the only way the normal allele of the male sterile gene locus would be transmissible apart from the linked deficiency would be as part of a double crossover chromatid arising from coincident double exchange within the inverted segment. Such occurrence would be expected to be so rare as to be negligible.

For use in these procedures, therefore, a stock might be developed that carried a short paracentric inversion in one chromosome and carried within that inverted segment the normal (+) allele of a suitable male sterile gene locus and an adjacent deficiency that was egg-viable but not pollen-transmitted; the homologous chromosome would be a chromosome of normal structure carrying the recessive male sterile gene allele. Such a plant would be heterozygous for a paracentric inversion and likewise heterozygous for a deficient segment and for a closely-linked male sterile gene locus. If the symbol "Inv" is used to mark each of the points of interchange of the inverted segment, the genotype of such a plant would be as follows:

$$\frac{Inv + DfInv}{NmsNN}$$

It may be seen that the use of accessory chromosome aberrations such as have just been described do not constitute a fundamentally different procedure. The differential transmission of alleles at a male sterile gene locus would still be accomplished through linkage with a differentially transmitted deficient segment. The use of accessory chromosome aberrations as here described simply serves as a means of reducing recombination between the male sterile gene locus and that deficient segment or as a means of eliminating recombinant chromatids that result from such recombination.

In the procedures which have been detailed earlier, seed produced by self-pollination of heterozygous deficient or duplicate-deficient plants in pollinator rows serves as the seed source for planting additional pollinator rows. Up to one-half the plants in such pollinator rows are male fertile plants of the parental genotype; the remainder are male sterile. The initial source of seed for planting female rows of male sterile plants might be seed resulting from sib pollination that was borne on male sterile plants in pollinator rows. Subsequently, seed for planting such female rows would be more efficiently produced on the male sterile plants in female rows that were grown in isolation in pollinating proximity to rows of the pollinator type.

In order to have seed from duplicate-deficient or deficient plants in pollinator rows, any of several procedures might be used. If there is a significant proportion of male fertile plants of undesirable genotypes in pollinator rows, the safest procedure is to maintain "breeder's stocks" as previously described. This would be accomplished by hand-pollination and hand-harvest.

If, on the other hand, linkage between the male sterile gene locus and the adjacent point of deficiency were so very nearly complete that virtually all male fertile plants in pollinator rows were of the appropriate genotype, then routine seed increase for planting pollinator rows might be accomplished by growing such rows in isolation and allowing them to open-pollinate. In order to save seed for planting pollinator rows, it would still be necessary to harvest ears only from the male fertile plants in such rows. To do this, any of several procedures might be used to increase the efficiency of the operation:

a. Mark male fertile plants and hand-harvest ears only from these plants.

b. Remove male sterile plants from the row before machine-harvest.

c. If ears borne on duplicate-deficient plants show a discernable amount of sterility, all ears from the pollinator row might be machine-harvested and the fully-set ears (those borne on male sterile plants) could be discarded. A low level of classification mistakes would not be serious—it would simply decrease somewhat the proportion of fertile plants in subsequent plantings of pollinator rows.

d. In some cases, duplicate-deficient kernels are somewhat smaller than normal sib kernels borne on the same ear. It might be possible, then, by selecting smaller kernels for planting to increase the proportion of fertile plants in pollinator rows.

e. Recessive marker genes closely linked to the $ms$ locus in heterozygous deficient or duplicate-deficient plants might be used as a means of identifying presumptive male sterile plants at pre-tasseling stages. Any of a variety of visible plant traits might be used for this purpose to permit removal of male sterile plants before machine-harvest.

f. Use of a lethal seedling trait gene closely linked to the $ms$ locus (providing, of course, that such a gene is available or can be found). Several categories of traits exhibiting lethality at the seedling stage would be suitable, e.g., albinos, seedling necrotics, and certain luteus traits. A pollinator row stock employing an albino gene ($w$) could be used in conjunction with heterozygous deficient plants or with duplicate-deficient plants derived either from pericentric inversion stocks or reciprocal translocation stocks. The use of an albino gene in conjunction with duplicate-deficient plants derived from reciprocal translocation stocks will be specifically detailed.

A pollinator-maintainer stock (FIG. 45) would employ the same genetic marking shown in FIG. 44, except for the addition of a linked albino gene ($w$). As in the case of the $ms$ locus, the single normal (wild-type) allele of the albino locus present in a heterozygous deficient or duplicate-deficient plant would be carried on the deficient or interchanged chromosome at a position closely linked to the deficiency or interchange point. Except in the case of a simple terminal deficiency, however, that position need not be on the same side of the deficiency or the interchange point as the $ms$ locus. In FIG. 45, the $w$ locus is shown on the opposite side of the interchange point from the $ms$ locus. Other allelic positions of the albino gene locus in a heterozygous deficient or duplicate-deficient plant would carry the recessive $w$ allele.

If there were no recombination between the $w$ locus and the adjacent interchange point or between the $ms$ locus and the interchange point in a plant of the constitution shown in FIG. 45, seed from self-pollination would yield progenies in which genetically male sterile plants would be lethal at the seedling stage due to the linked albinism trait ($w/w$ $ms/ms$). Surviving plants would be of the parental type and seed that was machine-harvested from them would perpetuate the duplicate-deficient pollinator-maintainer stock. The genotype of the parent plant may be indicated as $6+^{9+}$ $9ms/$ $6$ $w$ $9ms$; the progeny from self-pollination are shown in TABLE XVI.

TABLE XVI

| | | $6w$ | $9ms$ | | |
|---|---|---|---|---|---|
| $6+^{9+}$ | $9ms$ | $6+^{9+}$ | $9ms/$ | $6w$ | $9ms$ |
| $6w$ | $9ms$ | $6w$ | $9ms/$ | $6w$ | $9ms$ |

A duplicate-deficient pollinator-maintainer stock would be derived by a procedure similar to that used to derive plants of the constitution shown in FIG. 44. The recessive $ms$ and $w$ alleles could be converted simultaneously to an inbred line, or they could be converted separately and then combined. A duplicate-deficient plant carrying appropriate marking for the $ms$ and $w$ loci would when self-pollinated yield at least half albino seedlings and few, or no, surviving male sterile plants. The same plant when testcrossed to male sterile plants would give virtually all male sterile progeny.

A duplicate-deficient pollinator-maintainer stock of the genotype shown in FIG. 45 might be substituted entirely for a stock of the genotype shown in FIG. 44 in foundation field procedures. In developing seed stocks for planting female rows of male sterile plants, it would be necessary initially to use an inbred-converted male sterile stock not carrying a linked albino gene. Thereafter, however, a duplicate-deficient pollinator-maintainer stock might be employed as a pollinator for female rows to increase seed for planting subsequent female rows. Since half the plants in these female rows would be albino in subsequent generations (surviving plants would be heterozygous albino, ($+/w$), it would be necessary to plant at double the rate desired in the final stand. Pollinator-maintainer rows would themselves be planted at a rate sufficient to compensate for seedling lethality resulting from albinism.

It may be noted that in combined marking of pollinator-maintainer plants with $ms$ and $w$ alleles, it is preferable that the $ms$ and $w$ loci be on opposite sides of a deficiency or of an interchange point. In this way, a crossover that removes the normal allele of the $ms$ locus from the deficient or interchanged chromosome does not at the same time carry along the normal allele of the albino gene locus.

Two uses might be served by a pollinator-maintainer stock. If pollinator-maintainer rows are overplanted to compensate for lethality of albino plants, more male fertile plants would be present in these rows to serve their function as a pollen source for adjacent female rows of male sterile plants. Second, if in the stock employed in pollinator-maintainer rows, linkage of the $ms$ locus with chromosome deficiency were sufficiently close to make it unnecessary to maintain breeder's stocks by hand pollination, the seed for planting such pollinator-maintainer rows might be produced in isolation by open-pollination and the ears might be machine-harvested.

It should again be emphasized that deficient or duplicate-deficient plants would be used only in foundation fields, never in production fields. Hybrid seed sold to farmers would not yield male sterile or albino plants in farm fields.

Differential transmission of alleles at linked loci has been demonstrated for each of these three types of stocks. The greatest amount of information is available concerning duplicate-deficient chromosome complements derived from reciprocal translocations. Three examples demonstrating differential transmission of alleles at loci linked to deficient segments in such stocks may be cited.

From stocks of reciprocal translocation 4–6b (4S.71; 6L.25), duplicate-deficient plants of the constitution $4^6 Su_1\ 4\ su_1\ 6\ 6$ were derived. When these plants were crossed as male parents to $su_1/su_1$ testers, the $su_1$ allele was transmitted by 88.3 percent of the pollen which functioned in fertilization (475/538 kernels).

From stocks of reciprocal translocation 2–3e (2S.9; 3L.3), duplicate-deficient plants of the constitution $2^3 + 2\ lg_1\ 3\ 3$ were derived. When these plants were crossed as male parents to $lg_1/lg_1$ testers, only one plant among 1219 progeny plants was of the constitution $lg_1/+$. Thus, more than 99.9 percent of the functioning pollen from the male parent carried the $lg_1$ allele.

From stocks of reciprocal translocation 9–10a (9L.14; 10L.92), duplicate-deficient plants of the constitution $9\ 9\ 10^9\ 10$ have been derived. The loci of $sr_2$ and $w_2$ are within the deficient segment at the tip of the long arm of chromosome 10. The R locus is proximal to the interchange point in the $10^9$ chromosome and shows about five percent recombination with that point; the $l_1$ locus is likewise proximal to that interchange point and shows less than two percent recombination with that point of deficiency. Extensive additional information has been obtained in studies of this reciprocal translocation. Sparse pollinations using pollen from plants of the duplicate-deficient constitution shown above indicated that even in the absence of pollen competition, there was no functioning of $9\ 10^9$ duplicate-deficient pollen. Indirect evidence indicates that the $ms_2$ locus is carried on the triplicated segment of chromosome 9 at a position closely linked with the interchange point.

V. ALTERNATIVE VERSIONS OF INBRED LINES

Several versions of a particular inbred line, e.g., Oh43, may be useful in hybrid maize production which utilizes the procedures of the invention.

A. Standard Oh43

Standard versions of inbred lines are already available to commercial maize breeders. These standard versions would continue to be useful. Ordinarily, the procedures of this invention would be used to produce and maintain additional versions of only those inbred lines that were to be used directly as female parents (or as components of female parents) in hybrid maize production. Standard versions of inbred lines or single crosses would ordinarily be used as male parents in production fields. However, as indicated later in the summary foundation and production field procedures, in deriving single crosses for use as pollen parents in production fields there would be an option to use versions of inbred lines developed for use in procedures utilizing sterile cytoplasm stocks.

B. Genic Male Sterile Oh43

Initially Oh43 would be converted to carry a recessive male sterile gene allele. Male sterile Oh43 plants would be derived by self-pollination of converted plants. Routine maintenance would be by sib pollinations: $ms/ms$ by $ms/+$.

C. Pollinator Stock of Oh43-Converted Deficient or Duplicate-Deficient Plants Heterozygous For a Selected Male Sterile Gene Seed stocks that include plants of the desired genotype are produced by self-pollination of plants of the confirmed appropriate genotype. Confirmation of the desired genotype may be achieved by testcrossing. When plants of appropriate genotype are used as pollinators on plants of male sterile Oh43, most progeny plants are male sterile. This improved procedure for producing male sterile Oh43 plants might largely replace the maintenance of stock (B) by sib pollination.

D. Pollinator-Maintainer Stock (Oh43)

This stock would be similar to stock (C), except for the addition of a linked albino, or similar-acting, gene. If a stock such as this were developed for use in these procedures, it might supplant stock (C) for most purposes.

VI. SCHEMATIC OUTLINE OF SUITABLE FOUNDATION AND PRODUCTION FIELD PROCEDURES

The following outline summarizes certain suitable procedures for the practice of the present invention.

In the summary, rare recombinant types are ignored. Abbreviations are used which have the following meanings:

"GS" indicates the seed source for planting female rows of genic male sterile plants; alternatively, male sterile plants in such rows;

"GM" indicates the seed source of deficient or duplicate-deficient maintainer plants which when used as pollinators on genic male sterile plants produce the seed source (GS) for female rows of genic male sterile plants; alternatively, plants of such maintainer constitution;

"A", "B", "C" & "D" indicate inbred lines.

1. Seed increase of GS (A)
GS (A) by GM (A) yields GS (A)
2. Increase of GM (A)
GM (A) by GM (A) yields GM (A) and $ms/ms$ (A)
3. Verification of individual GM plants
$ms/ms$ (A or B) by GM (A or B) yields $ms/ms$ (A, B, AB, or BA)
4. Source of GS (AB)
GS (A) by GM (B) yields GS (AB)

5. Production of commercial single cross hybrid (AB)
  GS (A) by Standard B yields (AB) (*ms/ms*) (+/+) (all hybrid plants are male fertile, ms/+)
6. Production of commercial three-way cross hybrid (AB)C
  GS (AB) by Standard C yields (AB)C (from (4), above)
  (ms/ms) (+/+) (all hybrid plants are male fertile, ms/+)
7. Production of double-cross hybrid seed (AB) (CD)
  a. Female row, GS (AB), from (4) above
  b. Source of male fertile single-cross male parent (CD)
    Alternative 1: Detassel standard C; pollinate by standard D. All plants from the double cross will be male fertile (*ms/+*).
    Alternative 2: Make the cross,

| C | by | D |
|---|---|---|
| T-sterile; | | Restorer strain; |
| $rf_1/rf_1$  $rf_2/rf_2$ | | $Rf_1/Rf_1$  $Rf_2/Rf_2$ |
| (non-restored) | | (restorer genes) |

All resulting single-cross plants (CD) will be male fertile (sterile cytoplasms other than T-sterile cytoplasm could be used with analogous pollen restorer genotypes in the parents). All plants from the double-cross will be male fertile (*ms/+*).
  Single-cross pollinators produced by either of these methods would not carry a recessive nuclear male sterile gene allele.

Obviously, modifications and variations of the above described invention may be made without departing from the spirit and scope thereof. Various other aberrant chromosome complements other than those specifically detailed here might be employed as variations, either in origin or structure, of aberrant chromosomes useful in the procedures of the invention. For example, an internal chromosome deficiency carrying an inserted chromosome segment from elsewhere in the genome is not fundamentally distinct in its uses in these procedures from a terminal deficiency in which the deficient segment has been replaced by a different chromosome segment. Therefore, only such limitations as are indicated in the appended claims shall be placed thereon.

What is claimed is:

1. The method of obtaining seed of male sterile maize, said method comprising;
  pollinating maize plants, homozygous for male sterile alleles of a selected male sterile gene locus, with pollen from plants heterozygous for male sterile and male fertile alleles of said gene locus, wherein the male fertile allele is linked genetically to a differentially transmitted variation of chromosomal constitution; and, harvesting seed produced on said plants homozygous for male sterile alleles.

2. The method of claim 1 wherein said variation of chromosomal constitution comprises a chromosomal segment deficiency.

3. The method of claim 2 wherein said chromosomal segment deficiency is a terminal deficiency.

4. The method of claim 2 wherein said chromosomal segment deficiency is an internal deficiency.

5. The method of claim 1 wherein said variation of chromosomal constitution comprises a chromosomal duplication-deficiency including a chromosomal segment deficiency and a chromosomal segment triplication.

6. The method of claim 5 wherein said locus of said male sterile gene is proximal to the deficiency.

7. The method of claim 5 wherein said locus of said male sterile gene is included in the segment triplicated.

8. The method of producing seed of male sterile maize, said method comprising;
  growing male sterile plants, homozygous for male sterile alleles of a selected male sterile gene locus, in pollinating proximity to male fertile plants heterozygous for male sterile and male fertile alleles of said gene locus, wherein the male fertile allele is genetically linked to a differentially transmitted variation of chromosomal constitution; and,
  harvesting the seed from said male sterile plants.

9. The method of claim 8 wherein said variation of chromosomal constitution comprises a chromosomal segment deficiency.

10. The method of claim 9 wherein said chromosomal segment deficiency is a terminal deficiency.

11. The method of claim 9 wherein said chromosomal segment deficiency is an internal deficiency.

12. The method of claim 8 wherein said variation of chromosomal constitution comprises a chromosomal duplication-deficiency including a chromosomal segment deficiency and a chromosomal segment triplication.

13. The method of claim 12 wherein said locus of said male sterile gene is proximal to the deficiency.

14. The method of claim 12 wherein said locus of said male sterile gene is included in the segment triplicated.

15. The method of producing hybrid maize seed, said method comprising;
  growing male fertile maize plants of a first genetic composition in pollinating proximity to male sterile maize plants of a second, differing, genetic composition,
  said male sterile plants being derived through pollination of maize plants, homozygous for male sterile alleles of a selected male sterile gene locus with pollen from plants heterozygous for male sterile and male fertile alleles of said gene locus, wherein the male fertile allele is linked genetically to a differentially transmitted variation of chromosomal constitution; and, harvesting the seed produced on said male sterile plants.

16. The method of claim 15 wherein said variation of chromosomal constitution comprises a chromosomal segment deficiency.

17. The method of claim 16 wherein said chromosomal segment deficiency is a terminal deficiency.

18. The method of claim 16 wherein said chromosomal segment deficiency is an internal deficiency.

19. The method of claim 15 wherein said variation of chromosomal constitution comprises a chromosomal duplication-deficiency including a chromosomal segment deficiency and a chromosomal segment triplication.

20. The method of claim 19 wherein said locus of said male sterile gene is proximal to the deficiency.

21. The method of claim 19 wherein said locus of said male sterile gene is included in the segment triplicated.

* * * * *